(12) United States Patent  (10) Patent No.: US 7,392,133 B2
Maruyama et al.  (45) Date of Patent: Jun. 24, 2008

(54) CAR NAVIGATION SYSTEM

(75) Inventors: Kishiko Maruyama, Kokubunji (JP); Masaaki Tanizaki, Nishitokyo (JP); Shigeru Shimada, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 18 days.

(21) Appl. No.: 10/790,774

(22) Filed: Mar. 3, 2004

(65) Prior Publication Data

US 2004/0236507 A1 Nov. 25, 2004

(30) Foreign Application Priority Data

May 21, 2003 (JP) ............................. 2003-143713

(51) Int. Cl.
G06T 15/20 (2006.01)
(52) U.S. Cl. ..................... 701/208; 345/428; 345/419; 340/995.17; 340/995.13
(58) Field of Classification Search ................ 701/208, 701/207, 209, 211, 212; 340/995.1, 988, 340/990, 995.17, 995.13; 382/103; 345/427, 345/428, 419, 519
See application file for complete search history.

(56) References Cited

U.S. PATENT DOCUMENTS

| | | | | |
|---|---|---|---|---|
| 5,568,390 A | * | 10/1996 | Hirota et al. ................. | 701/201 |
| 5,892,463 A | * | 4/1999 | Hikita et al. ............ | 340/995.13 |
| 6,040,824 A | | 3/2000 | Maekawa et al. | |
| 6,128,571 A | | 10/2000 | Ito et al. | |
| 6,169,552 B1 | * | 1/2001 | Endo et al. .................. | 345/427 |
| 6,351,706 B1 | * | 2/2002 | Morimoto et al. ........... | 701/208 |
| 6,434,482 B1 | * | 8/2002 | Oshida et al. ................ | 701/209 |
| 6,970,786 B2 | * | 11/2005 | Hayama et al. .............. | 701/209 |
| 2001/0028350 A1 | * | 10/2001 | Matsuoka et al. ........... | 345/427 |
| 2002/0053984 A1 | * | 5/2002 | Yamashita et al. ........... | 340/988 |
| 2002/0188400 A1 | * | 12/2002 | Sato et al. .................... | 701/212 |
| 2003/0023374 A1 | * | 1/2003 | Shimabara ................... | 701/212 |
| 2003/0045996 A1 | * | 3/2003 | Yamazaki et al. ............ | 701/200 |
| 2003/0055559 A1 | * | 3/2003 | Kuroda et al. ................ | 701/208 |
| 2003/0128211 A1 | * | 7/2003 | Watanabe et al. ............ | 345/428 |
| 2003/0191585 A1 | * | 10/2003 | Sakamoto et al. ........... | 701/211 |
| 2003/0216860 A1 | * | 11/2003 | Shitamatsu et al. .......... | 701/211 |

FOREIGN PATENT DOCUMENTS

| | | |
|---|---|---|
| JP | 9-264750 | 10/1997 |
| JP | A-2001-273526 | 10/2001 |
| JP | A-2002-206928 | 7/2002 |
| JP | 2003-114747 | 4/2003 |

* cited by examiner

*Primary Examiner*—Tuan C To
(74) *Attorney, Agent, or Firm*—Antonelli, Terry, Stout & Kraus, LLP.

(57) ABSTRACT

A car navigation system by which a user can easily grasp a drop-in target in the course of a route. In a summary road map displayed in a two- or one-window display representation, contents of a two-dimensional road map is properly selected and simplified, roads are made linear, roads connected to an intersection are made orthogonal so that the user can easily see it, the position of a vehicle is expressed by a mark, and even the running route is expressed with a predetermined color or the like. Accordingly, the system offers the user such a display form as able to easily refer to. When the user specifies a target at which the user wants to drop in, the drop-in target is displayed at a corresponding position on the summary road map in the form of a land mark.

15 Claims, 35 Drawing Sheets

FIG.15
ORTHOGONALIZE/LINEARIZE
E1: EVALUATE EACH OF LINKS
CONNECTED BETWEEN NODES
(SAVE LINK LENGTH $\nu_{ij}$)
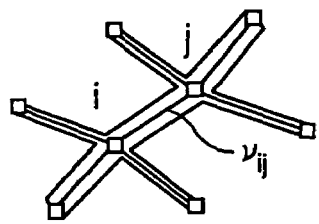
(a)
E2: EVALUATE EACH RELATIVE ANGLE
BETWEEN ADJACENT LINKS
(NORMALIZE RELATIVE ANGLE $\theta_{ijk}$)
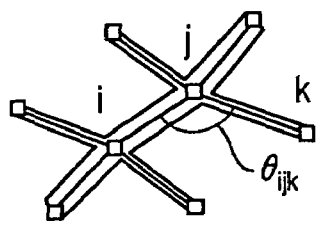
(b)
E3: EVALUATE EACH RELATIVE ANGLE
BETWEEN LINEAR LINKS
(NORMALIZE RELATIVE ANGLE $\theta_{ijl}$)
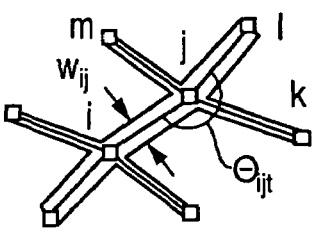
(c)
EVALUATION FUNCTION
E=E1+E2+E3 → MINIMIZE
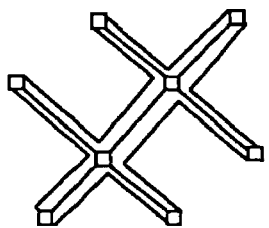
(d)
30a

FIG.24
(a)
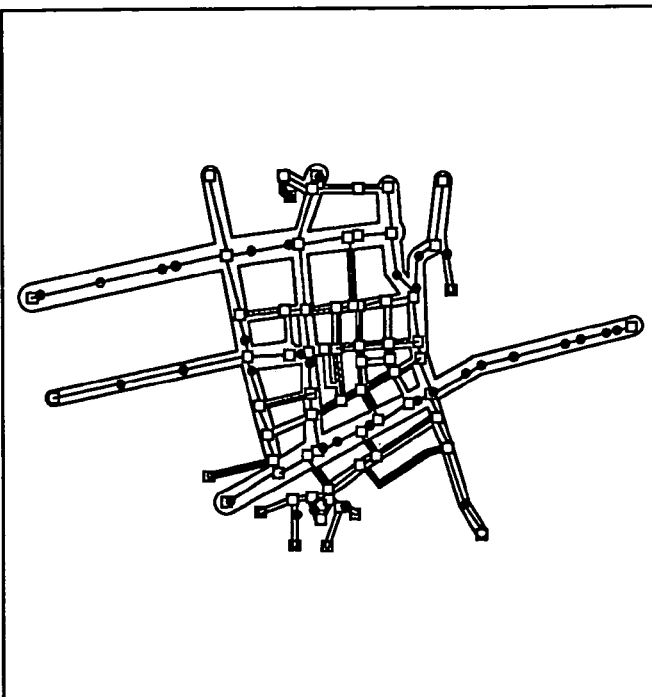
LINEARIZE
(b)
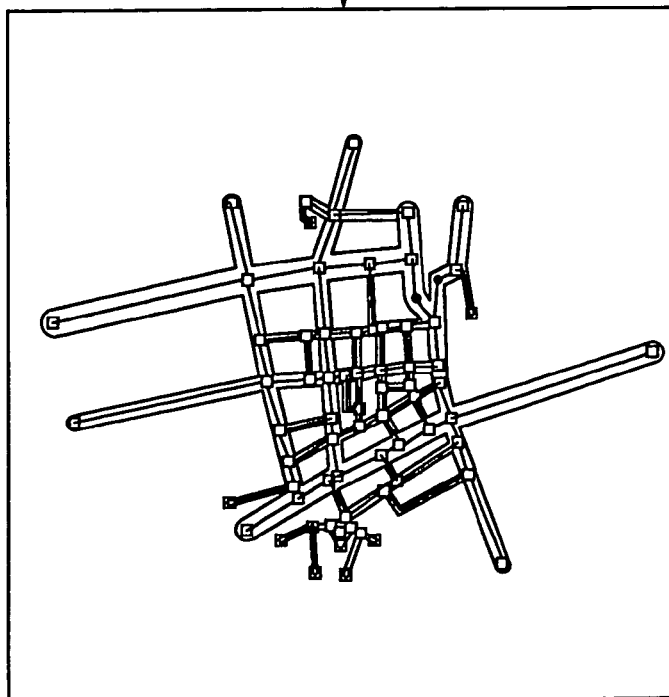

FIG.26
(a) 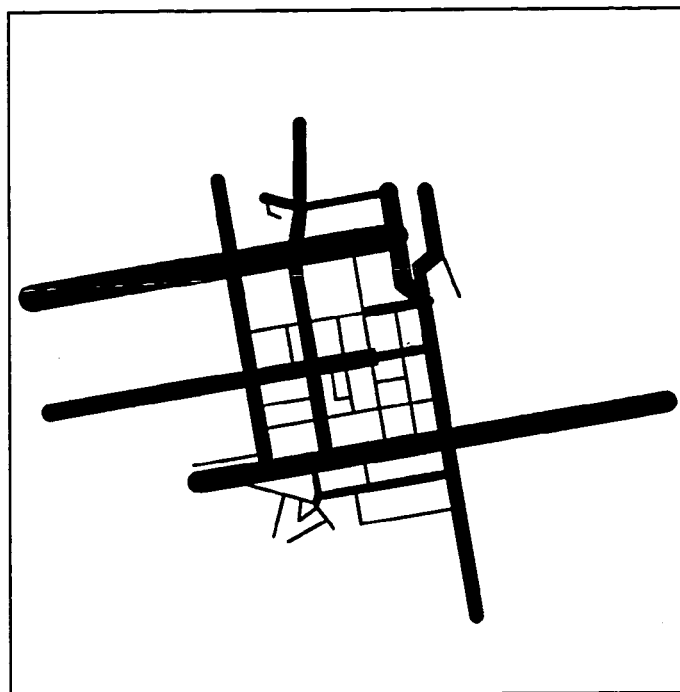
HORIZONALIZE / VERTICALIZE
(b) 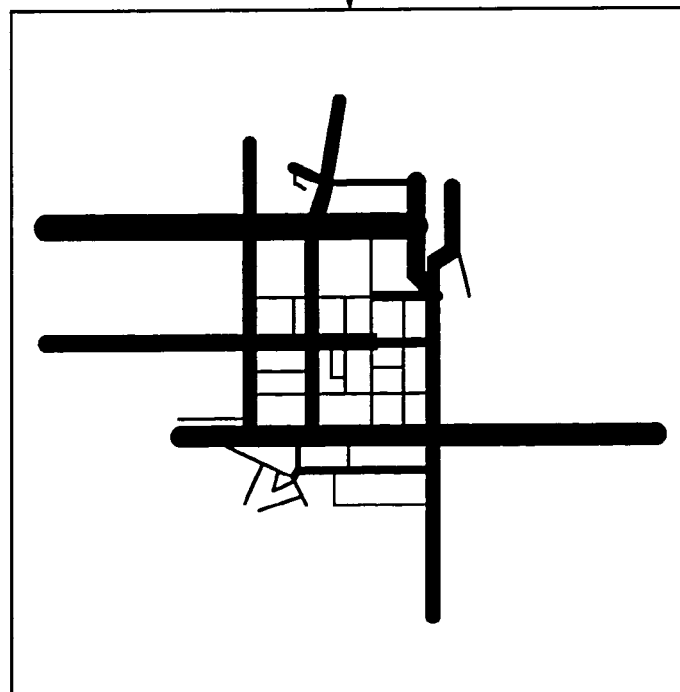

CAR NAVIGATION SYSTEM

BACKGROUND OF THE INVENTION

The present invention relates to a car navigation system which measures a current position of a vehicle, displays a map and the current position on the map on a display screen, and guides a passenger or driver of the vehicle to a target position.

As a prior art system for reliably guiding a vehicle to a target position along a route, a car navigation system is known. In an example of the prior art, for the purpose of displaying the vicinity of the current position of the vehicle (equipped with the system), the vicinity of the target position, or the vicinity of a guiding intersection in an easy-to-understand manner, there is proposed a system which displays a map in a three-dimensional manner (refer to, e.g., JP-A-2001-273526).

In a car navigation system disclosed in the above JP-A-2001-273526, structures on a road map in a bird's eye view are displayed three-dimensionally. As an example, buildings located within a predetermined distance from the current position of a vehicle are displayed as reduced or enlarged so that ones of the buildings closer to the current position of the vehicle are reduced to avoid the closer buildings from being hidden by other buildings; whereas, ones of the buildings located further from the current vehicle position are magnified for an easy-to-see purpose, thus improving the visibility of the three-dimensionally displayed map.

As another example of the prior art car navigation systems, there is proposed a car navigation system which can display as magnified the vicinity of the current position and can display a wide range of road map from the current position to target position (refer to JP-A-2002-206928).

The invention disclosed in the above JP-A-2002-206928 displays a road map in a bird's eye view. That is, the map is like viewed from above the vicinity of the current position of the vehicle in a vehicle heading direction or in a direction toward the target position. Thus the user can always grasp the situations of the vehicle running direction. At this time, flag marks are given to the current and target positions. And when the target position is out of the displayable range of the bird's eye view, a flag mark is attached to a position in the displayable range of the bird's eye view which is located in a direction toward the target position and is closer to the target position, enabling the driver to always grasp the current situations of a route toward the target position. In such a bird's eye view, further, a place located farther from the current position of the vehicle is given in the upper side of the display screen on a small scale, while the vicinity of the current position of the vehicle is given in the lower side of the display screen on a large scale. Thus, when all data (road data, title data, background data, etc.) are to be displayed in the bird's eye view, the quantity of data to be displayed becomes too much to be displayed in the upper side of the display screen of the small scale and covering a large area of the map. For this reason, priority order is applied to such data so that data including information having low priorities are displayed in the lower side of the display screen, while only data having high priorities are displayed in the upper side thereof.

In the car navigation system of the aforementioned JP-A-2001-273526, even such a building as to be actually hidden by its user-side building can be displayed and can be easily searched for. Meanwhile, even a building located at a further distance can be noticeably displayed as magnified and thus can be easily searched for. However, when the car runs in an area having many structures or in an area having many tangled roads crossing each other, many structures are displayed, which results in that the user cannot easily find a desired drop-in place in the many-structure area. In particular, in a city or town having many high-rise buildings, even when the driver wants to drop in at a desired restaurant or parking lot, such an area usually has many low buildings, so such a low building often tends to be hidden by another high building and cannot be displayed.

In the invention of the aforementioned JP-A-2002-206928, on the other hand, when a road map is displayed in a bird's eye view, the map is displayed two-dimensionally, so that even a restaurant, an area such as a parking lot or title data is displayed simultaneously. Thus such a desired area can be searched for from the road map. In the invention of the above JP-A-2002-206928, however, road data, title data or background data having a large scale and a low priority is displayed simultaneously. As a result, roads are displayed as intersected and tangled and many facilities are also displayed together with their titles, thus resulting in highly complicated display. For this reason, it is highly difficult to search for a restaurant or parking lot which is usually not a target position but at which the driver just wants to drop in. Further, when the driver wants to drop in at such a place after the vehicle runs by a certain distance, and even when the bird's eye view is displayed, it is impossible to display and find the place which has a low priority and is located away by a certain distance or more.

As mentioned above, prior art car navigation systems including the above two car navigation systems for guiding a vehicle up to a passenger's or driver's desired position (target position) along a running route have had a problem which follows. That is, when the driver wants to drop in at a restaurant or parking lot as necessary on the way to the target position, the driver must troublesomely search the displayed three-dimensional map or bird's eye view map for the desired drop-in place.

Such a car navigation system is usually designed to receive traffic information about a traffic jam caused by an accident, a road construction or the like. However, when the car navigation system receives such traffic information, the passenger or driver must troublesomely determine whether to run the vehicle along the guided route or to find a detour by himself. Thus when the driver have a poor knowledge of a road network in the vicinity, he has to inevitably run the vehicle along the congested route.

The aforementioned conventional car navigation system has another problem. That is, when the driver run the vehicle in an area such as a city or town having tangled roads crossing each other, a road map is displayed showing the tangled roads as they are, and the driver cannot sometimes find a running route easily. In particular, in the case of an intersection having a right or left turn, the driver has a hard time to find the intersection because the displayed road map has too much information.

In this way, the conventional car navigation systems including the above two car navigation systems also have a problem. That is, when a special situation takes place during the running of the vehicle along the route, no suitable, easy-to-understand guidance is given to the driver.

SUMMARY OF THE INVENTION

It is therefore an object of the present invention to provide a car navigation system which can solve the above problems in the prior art, guide a vehicle to a suitable route, guide the vehicle even a second target desired by a driver on the way to an initial target position, and allow the driver get the route to the target position easily and clearly.

In accordance with an aspect of the present invention, the above object is attained by providing a car navigation system which detects a position of a vehicle and displays a road map of an area for the detected vehicle position, together with a mark indicative of the vehicle position and a vehicle running route. The system includes means for displaying a summary road map about an area requested by a user. The summary road map is such a map that the display contents of a two-dimensional map are suitably selected and displayed and main roads including the vehicle running course are displayed as simplified.

A land mark specified by the user is displayed on the summary road map.

In the invention, in order to attain the above object, the car navigation system detects the vehicle position and displays the two-dimensional road map of an area for the detected vehicle position together with the mark indicative of the vehicle position and the vehicle running route. And the system is provided with means, when a user specifies departure and target positions, for displaying a summary road map in which a desired route between the departure and target positions is indicated by a simplified broken line.

When the user specifies the departure and target positions, this causes the system to search for a plurality of routes between the departure and target positions and to display the routes by simplified broken lines on the summary road map.

The system also includes a communication device for receiving traffic information and displaying the traffic information received by the communication device for the corresponding routes displayed on the summary road map.

The system further includes a communication device for receiving traffic information. Traffic information received by the communication device is displayed at a corresponding position of a corresponding route displayed on the summary road map, and simultaneously a detour passable from the vehicle position is displayed.

When the vehicle receives the traffic information about the vehicle running route, the above communication device automatically switches to a mode wherein the summary road map including the passable detour is displayed.

The summary road map including the passable detour is displayed together with the road map already displayed previously, in two display windows.

When the vehicle position arrives at a position within a predetermined range of the vehicle position from a predetermined major intersection, the summary road map from the current position of the vehicle to the major intersection is displayed.

The predetermined range is set to be broader than a range of the main intersection expressed in its enlarged road map.

A mark indicative of the vehicle position is displayed on each of the summary road maps. Roads expressed in the respective summary road maps are displayed as linearized and intersected each other at a right angle at each intersection.

Other objects, features and advantages of the invention will become apparent from the following description of the embodiments of the invention taken in conjunction with the accompanying drawings.

BRIEF DESCRIPTION OF THE DRAWINGS

FIG. 15 shows a specific example of the orthogonalizing/linearizing operation in FIG. 13;

FIG. 24 shows an actually processed result of the linearizing operation in FIGS. 17 to 19;

FIG. 26 shows an actually processed result of the horizontalizing/verticalizing operation in FIGS. 17 to 19;

DETAILED DESCRIPTION OF THE EMBODIMENTS

An embodiment of the present invention will be explained with reference to the accompanying drawings.

Figure 1:
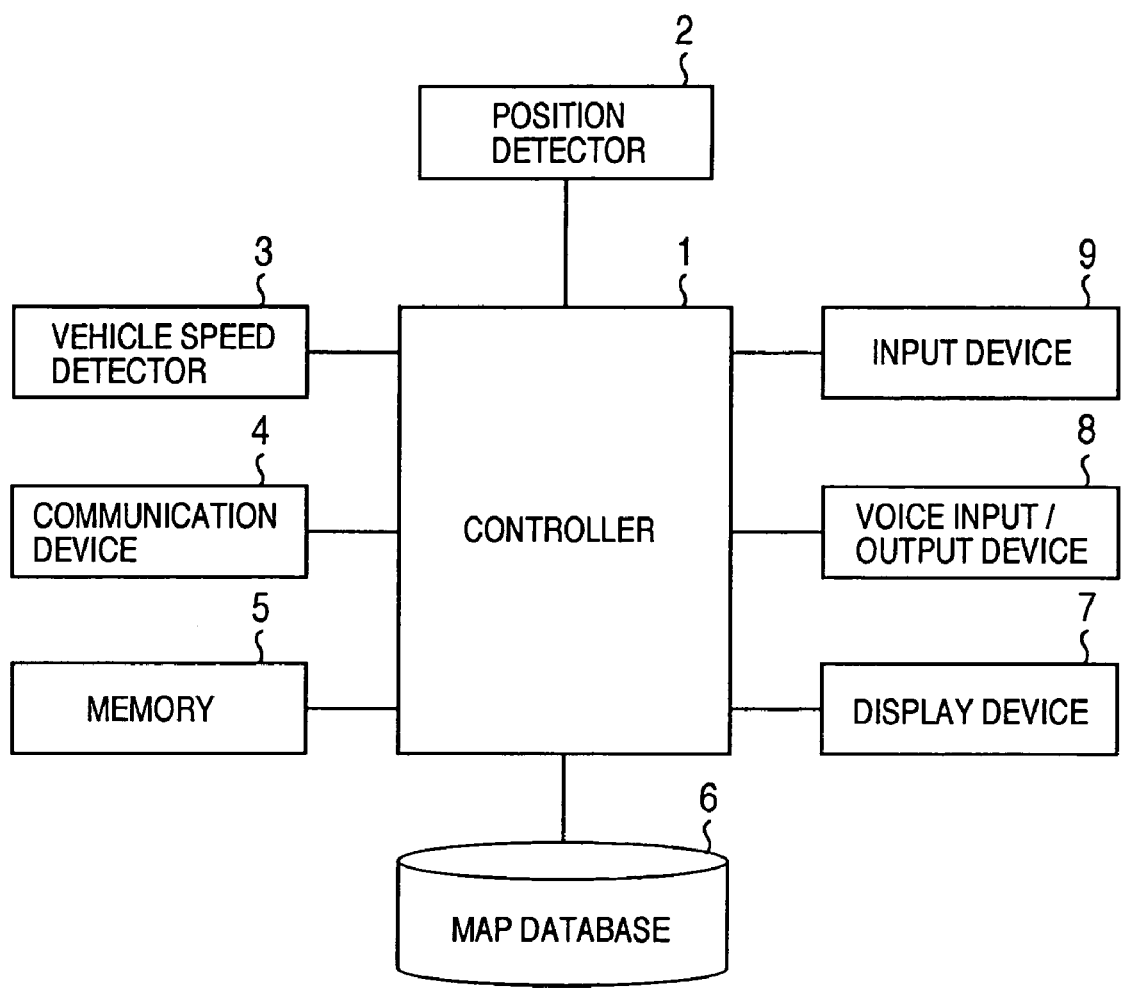
FIG. 1 is a block diagram of an arrangement of a car navigation system in accordance with an embodiment of the present invention.

FIG. 1 shows a block diagram of an arrangement of a car navigation system in accordance with an embodiment of the present invention, wherein reference numeral 1 denotes a controller, numeral 2 denotes a position detector, 3 denotes a vehicle speed detector, 4 denotes a communication device, 5 denotes a memory, 6 denotes a map database, 7 denotes a display device, 8 denotes a voice input/output device, and 9 denotes an input device.

In the drawing, the map database 6 has road map data for various areas stored therein, and such road map data is once downloaded in a memory 5 from an external device through the communication device 4. The road map data stored in the memory 5 is stored in the map database 6 under control of the controller 1. In the illustrated example, it is unnecessary to previously store road map data covering all national areas from the beginning. That is, when road map data corresponding to an area wherein a vehicle (which will be referred to merely as the vehicle, hereinafter) equipped with the car navigation system is to move is absent, the system can ask a server (not shown) for the road map data of the area to receive it.

The position detector 2 is a device for detecting the position of the vehicle based on, e.g., a global positioning system (GPS) or the like, and the vehicle speed detector 3 is a device for detecting the running speed of the vehicle. The position detector 2 detects the position of the vehicle at predetermined periods, and the position detection of the position detector 2 at timing periods is carried out on the basis of a result detected by the vehicle detector.

The input device 9 has a mechanical switch means and a touch switch displayed on a display screen of the display device 7. The driver operates the input device 9 to enter a command and to cause the car navigation system to be desirably operated.

The controller 1 performs navigation control over the devices of the system on the basis of a command entered from the input device 9. More specifically, the controller reads out road map data corresponding to the position of the vehicle from the map database 6 on the basis of positional information from the position detector 2 and vehicle information from the vehicle speed detector 3, attaches a mark (vehicle positional mark) indicative of the current position of the vehicle to the read-out road map data, and instructs the display device 7 to display the mark-attached road map data. In the present embodiment, as will be explained later, the display device 7 for the road map data has an ordinary two-dimensional (2-D) display mode, a bird's eye view display mode, a three-dimensional (3-D) display mode, a summary display mode, and a 2-window display mode. In the two-dimensional display mode, a road map is two-dimensionally displayed. In the bird's eye view display mode, the road map is displayed as viewed from a high viewing point. In the three-dimensional display mode, structures such as buildings are displayed three-dimensionally and a ground surface is displayed three-dimensionally as undulated. In the summary display mode, the two-dimensional road map is displayed as simplified by selecting necessary information from the road map and processing the shapes of roads, etc. In the 2-window display mode, the above display modes are combined and displayed in 2 windows. When the road map is displayed in the display mode other than the two-dimensional display mode, the controller 1 processes the road map data read out from the map database 6 and instructs the display device 7 to displays the processed data thereon.

The voice input/output device 8 has a loudspeaker for outputting a voice guidance, etc. as linked with the guiding operation of the vehicle based on the road map displayed on the display screen of the display device 7, and a reproducing unit for reproducing a recording medium such as a disk.

Explanation will then be made as to the display modes of the embodiment.

Figure 2:
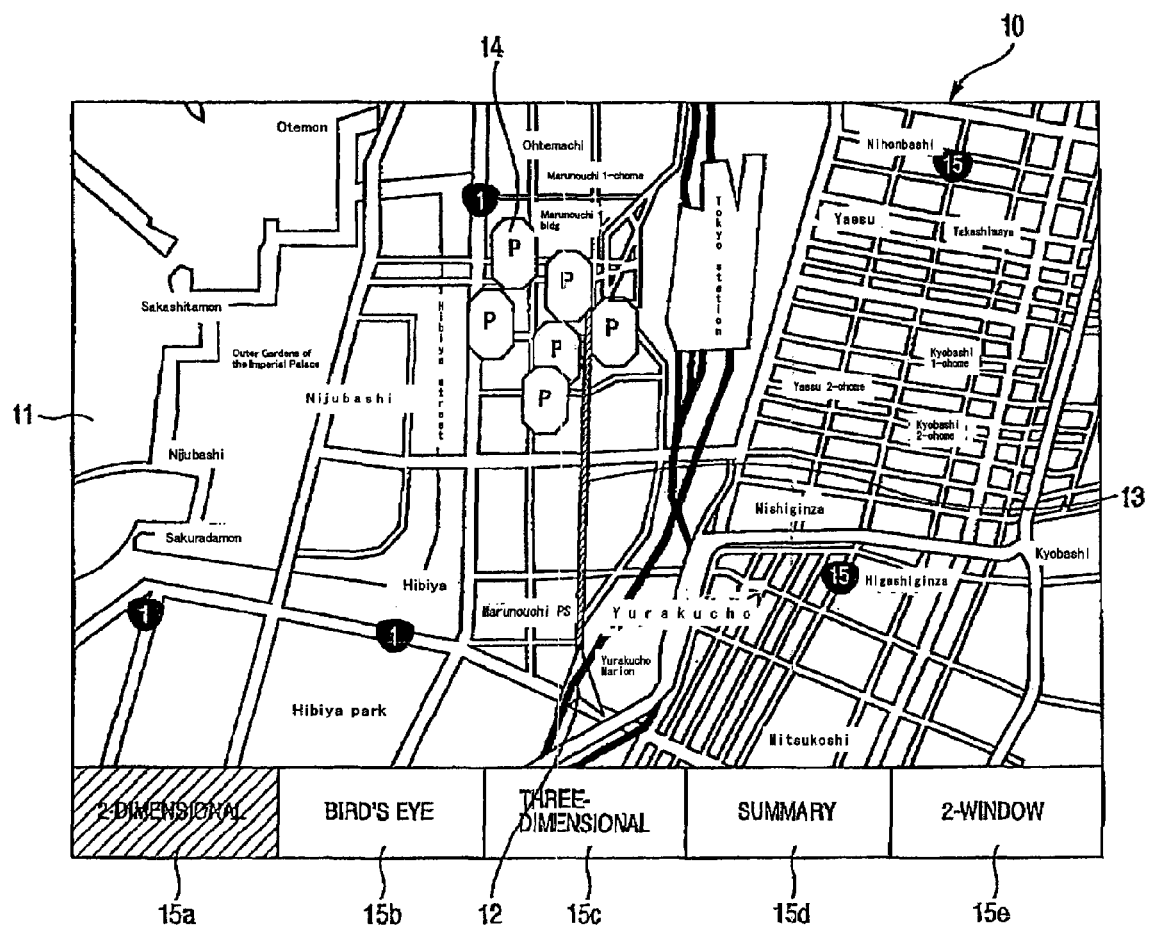
FIG. 2 shows a specific example of a two-dimensional road map expressed in the embodiment of FIG. 1.

FIG. 2 shows a specific example of two-dimensional display, wherein reference numeral 10 denotes a display screen of the display device 7, numeral 11 denotes a two-dimensional road map, 12 denotes a vehicle position mark, 13 denotes a guiding line, and 14 denotes a land mark (target mark).

In the drawing, the road map is displayed on the display screen 10 of the display device 7. Displayed on the two-dimensional road map 11 are the vehicle position mark 12 indicative of the current position of the vehicle as well as the guiding line 13 for guiding the vehicle from the current position along it. Simultaneously displayed on the map is a mark 14 (which is also referred to as the land mark) indicative of the position of a target facility desired by the driver on the way to the target position. In this example, the target facility is assumed to be a parking lot and a land mark for it is marked with 'P'. Of course, the target facility may be not only the parking lot but also another facility such as a restaurant or a convenience store. Even such a small parking lot that was not capable of being displayed in a conventional mere-magnified road map can be displayed in the summary road map associated with the target position to be explained later in the present embodiment. It is also possible to previously record detailed attribute information about facilities such as parking lots and to display the information by the user who clicks on any one of the facilities. As exemplary one of methods for displaying such land marks on the road map, a menu screen for selecting target facilities is displayed on the display screen 10 so that the user can suitably select target one from the displayed facilities, e.g., by touch operation. Of course, the selection may also be realized by another means such as voice input or remote control. The same holds true even for an embodiment to be explained later. In this case, it is also possible to set two or more target facilities, e.g., a parking lot and a restaurant simultaneously.

In this connection, the road map first displayed when the navigating operation of the system is started will be explained as the two-dimensional road map 11.

Five mode select buttons of a 'two-dimensional' display button 15a, a 'bird's eye view' display button 15b, a 'three-dimensional' display button 15c, a 'summary' display button 15d, and a '2-window' display button 15e are provided in a lower part of the display screen 10, e.g., along its lower side in the form of touch keys. When the user selects one of these buttons by touching it, the road map is displayed in the corresponding display mode. The display button of the mode selected by touching it, for example, is flashed or color-illuminated to indicate the fact that the button was selected. Since the two-dimensional road map 11 is selected and displayed in this illustrated example, the 'two-dimensional' display button 15a being selected is indicated by hatching.

Figure 3:
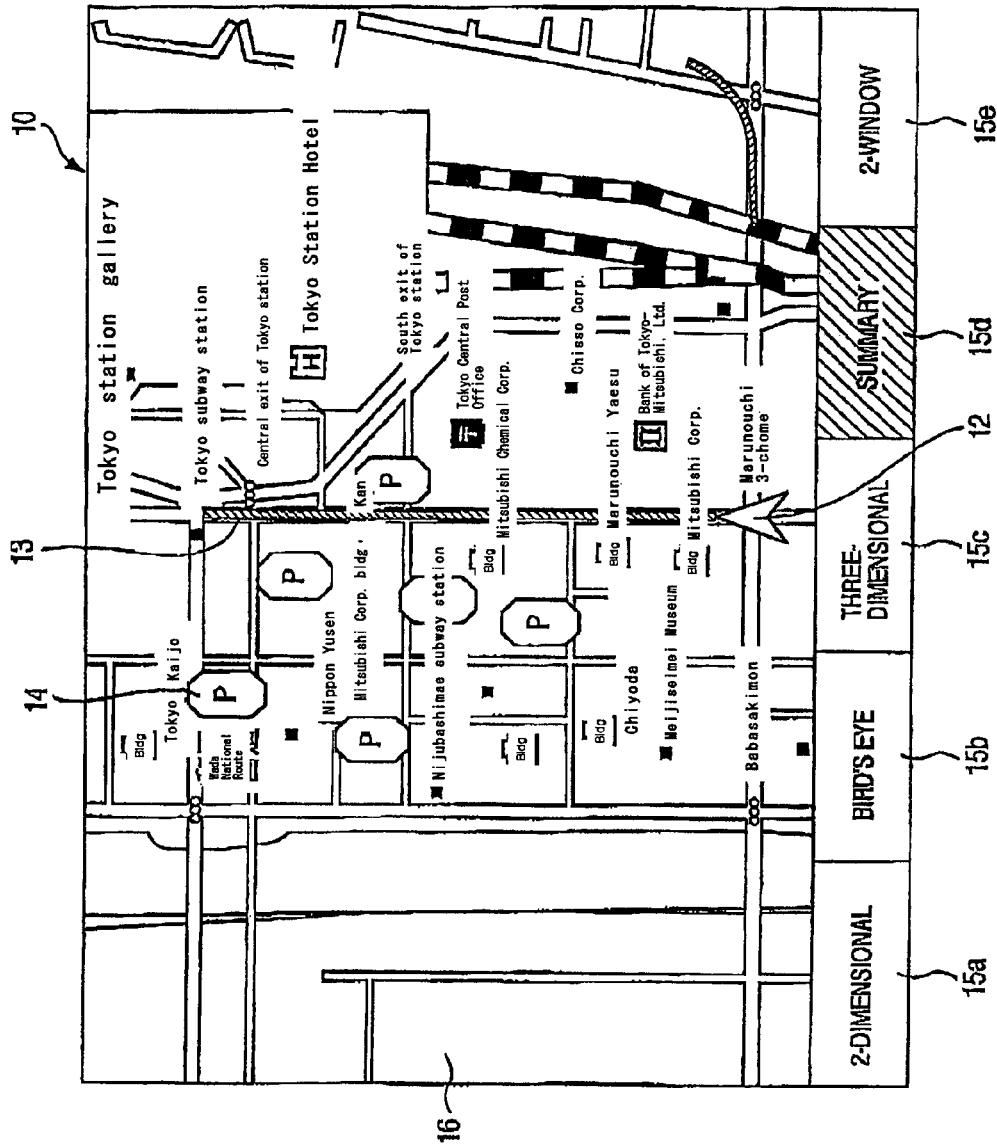
FIG. 3 is a specific example of a summary road map expressed in the embodiment of FIG. 1.

On such a display screen 10, touch selection of the 'summary' display button 15d causes a summary road map 16 to appear on the display screen 10 as shown in FIG. 3. In this case, parts corresponding to FIG. 2 are denoted by the same reference numerals or symbols. In the summary road map 16, roads are simplified by linearizing, orthogonalizing and simplifying actual map data, and facilities, their titles, place names, etc. are selected and overlapped with each other.

As mentioned above, the summary road map 16 is prepared based on data about such a two-dimensional road map 11 as shown in FIG. 2. That is, the data of the two-dimensional road map are suitably selected, for example, by deleting small roads, and processed. Further, the selected roads are linearized, roads meeting at an intersection are orthognalized, and such a summary road map is displayed as magnified so that the user can see it easily. Even in the summary road map 16, the vehicle position mark 12, guiding line 13 and land mark 14 are displayed. And the 'summary' display button 15d is highlighted by the aforementioned method to indicate the fact that the button 15d is being selected.

Though not shown herein, when the 'bird's eye view' display button 15b is touched and selected, a bird's eye view road map similarly appears on the display screen 10. When the 'three-dimensional' display button 15c is touched and selected, a three-dimensional road map similarly appears on the display screen 10.

Figure 4A:
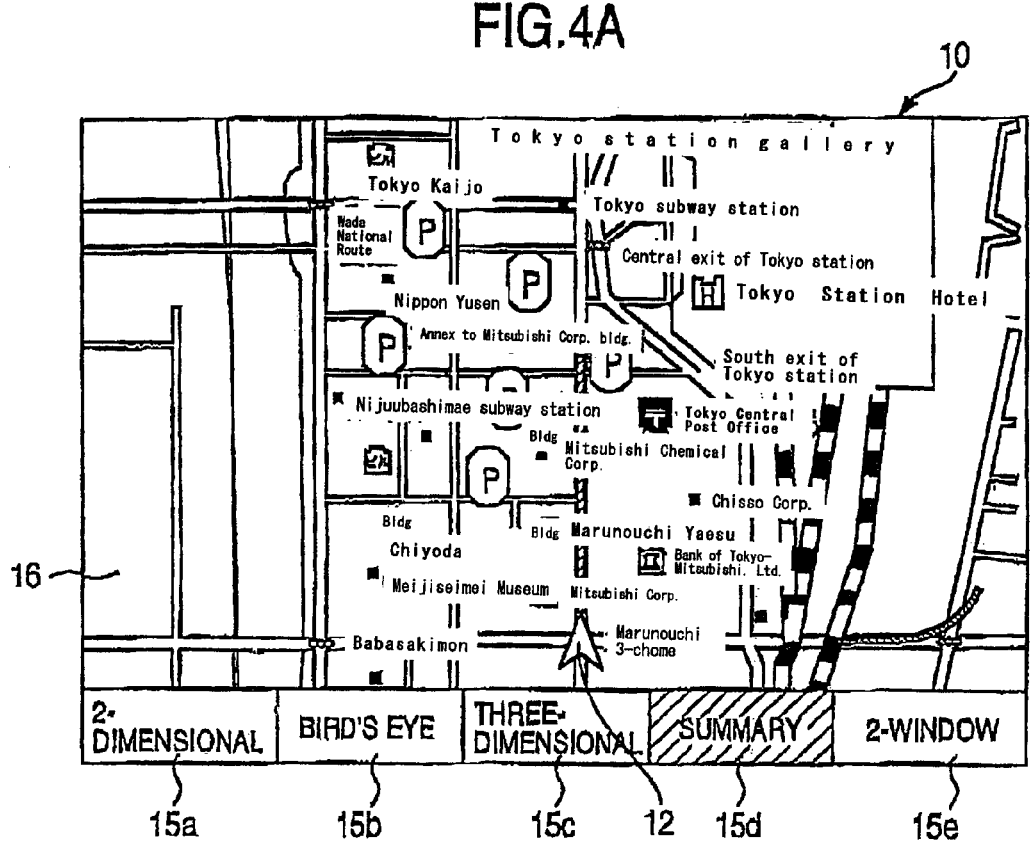
FIGS. 4A and 4B are maps for explaining a vector format representation in the summary road map.
Figure 4B:
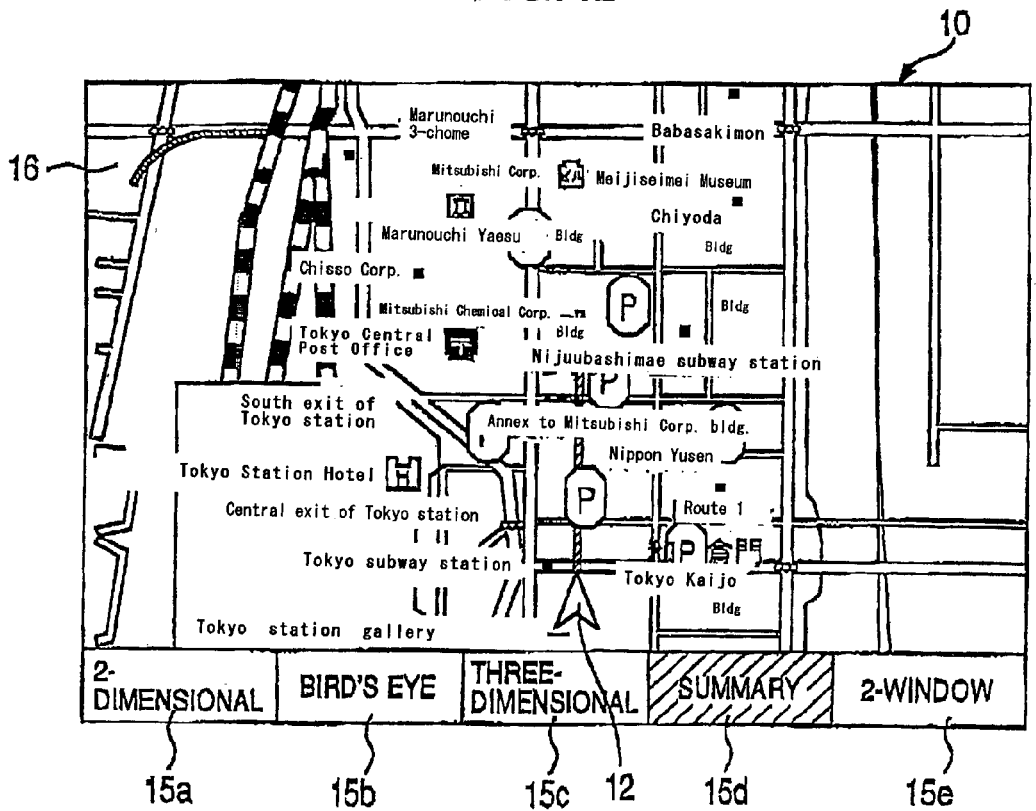

In this connection, since the summary road map is expressed in a vector format, the running direction of the vehicle is set to be always upwards of the display screen 10. Thus, if the vehicle running direction is changed, the road map can be rotated correspondingly. For example, FIG. 4A shows the summary road map 16 where the vehicle is running in a certain direction. If the vehicle is running in a direction opposed to the above running direction, then the running direction of the vehicle is kept upwards of the display screen 10 and the orientation of summary road map 16 is turned and inversed (upside down) as shown in FIG. 4B. In this case, even when the map orientation is changed, character strings indicative of building titles, etc. are displayed at corresponding positions normally when the map is viewed from the driver side, as a matter of course. The same holds true even for FIGS. 10 to 12 to be given later.

Figure 5A:
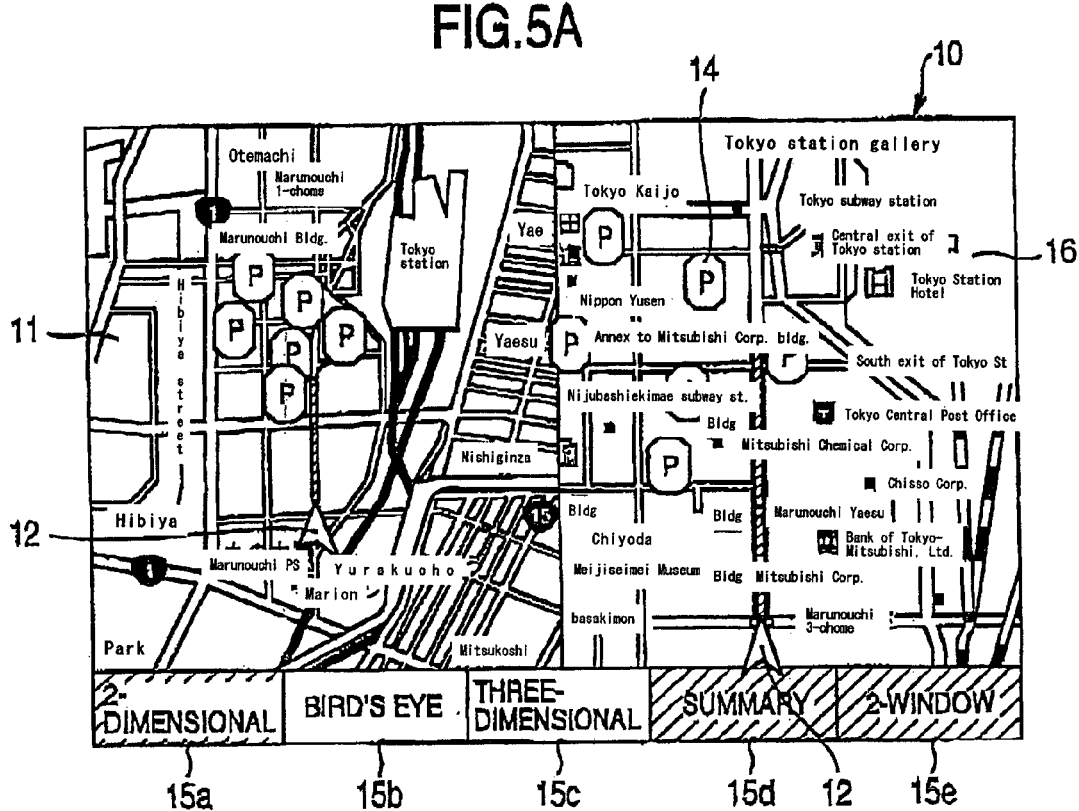
FIGS. 5A and 5B show specific examples displayed in two windows in the embodiment of FIG. 1 respectively.
Figure 5B:
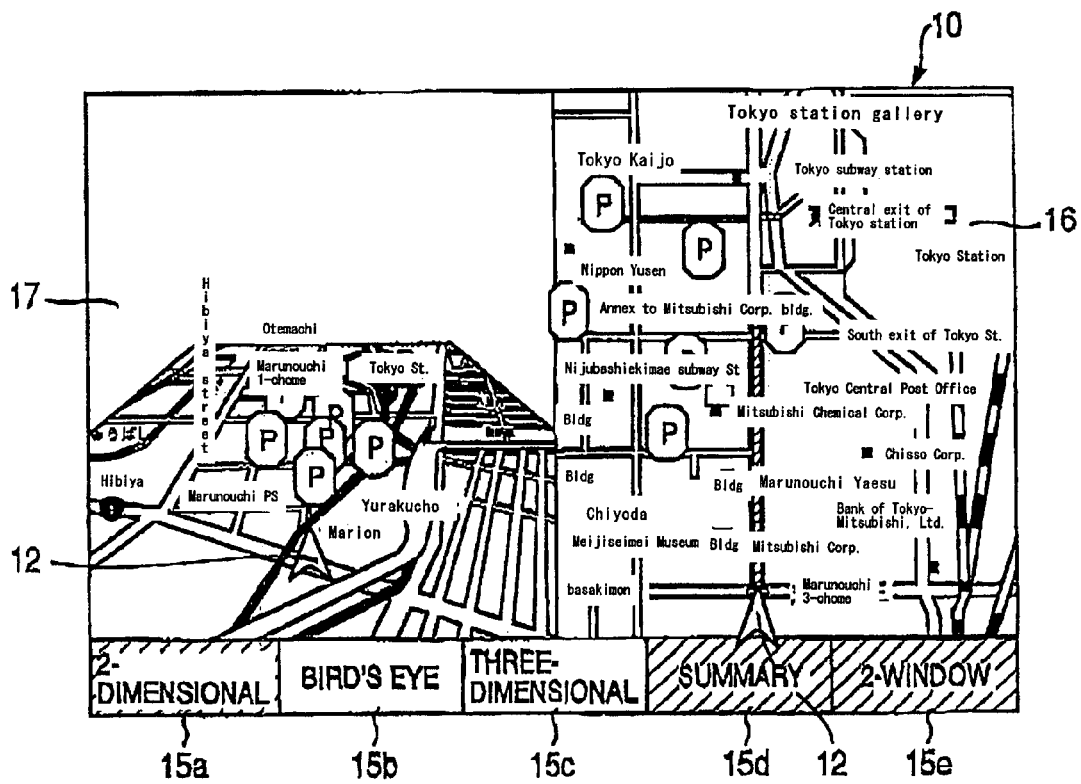

FIGS. 5A and 5B show display screens in the 2-window display mode.

In the 2-window display mode of the drawings, the display screen 10 is divided into two equal right- and left-side areas, on which road maps are displayed in different display modes. In FIG. 5A, the two-dimensional road map 11 is displayed on the left area while the summary road map 16 is displayed on the right area, forming the two-window display mode. Simultaneously with it, the 'two-dimensional' display button 15a, the 'summary' display button 15d, and the '2-window' display button 15e are also being selected and highlighted. In such a 2-window display mode, objects at the corresponding positions can be clearly shown and thus the user grasp the object positional relation intuitively.

In FIG. 5B, a bird's eye view road map 17 is displayed on the left-side area while the summary road map 16 is on the right-side area, forming the 2-window display mode. At the same time, the 'bird's eye view' display button 15b, 'summary' display button 15d, and '2-window' display button 15e are selected and highlighted. Since objects in the bird's eye view road map 17 can be viewed by the driver in such a manner that the driver can see the objects from his actual viewing point, the driver can easily confirm the objects in the summary road map 16.

In this connection, the bird's eye view road map 17, the three-dimensional road map, and the summary road map 16 are previously prepared and stored in the map database 6 by the controller 1 in FIG. 1 so that, when receiving a display command based on the touch selection of the mode selection display button from the input device 9 a, the controller reads out road map data corresponding to the detected current position of the vehicle to cause the display device 7 to display the map data. Or the controller may be controlled so that, each time the controller receives a display command from the input device 9, the controller reads out road map data corresponding to the current position of the vehicle from the map database 6, processes the map data to generate road map data in the display mode corresponding to the display command on a real time basis, and instructs the display device 7 to display the generated map data thereon.

The control also may be designed in the 2-window display mode so that, as the other road map displayed together with the summary road map 16 is scrolled, the summary road map 16 is also correspondingly scrolled.

Figure 6:
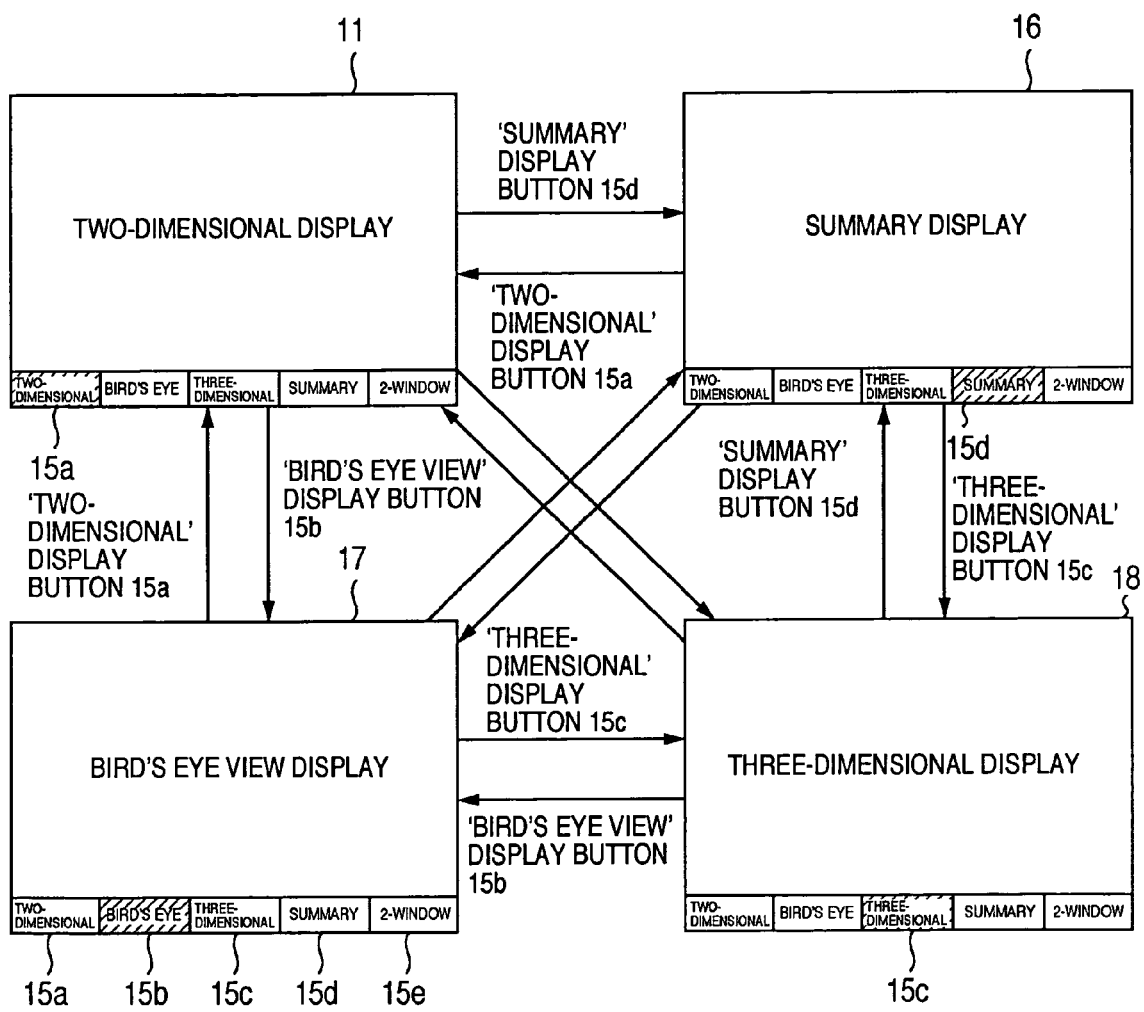
FIG. 6 shows a relationship between display mode select buttons and display modes of the road map in the embodiment of FIG. 1.

FIG. 6 shows a correspondence relation between the mode selection display buttons selected by touching and the display modes of the road map. As illustrated, even when the road map is displayed in any of the display modes, the touch selection of any of the mode select buttons causes the road map to be displayed in the corresponding display mode. For example, under a condition that the two-dimensional road map 11 is displayed, the touch selection of the 'bird's eye view' display button 15b causes the bird's eye view road map 17 to appear, the touch selection of the 'three-dimensional' display button 15c causes the three-dimensional road map 18 to appear, and the touch selection of the 'summary' display button 15d causes the summary road map 16 to appear.

Figure 7:
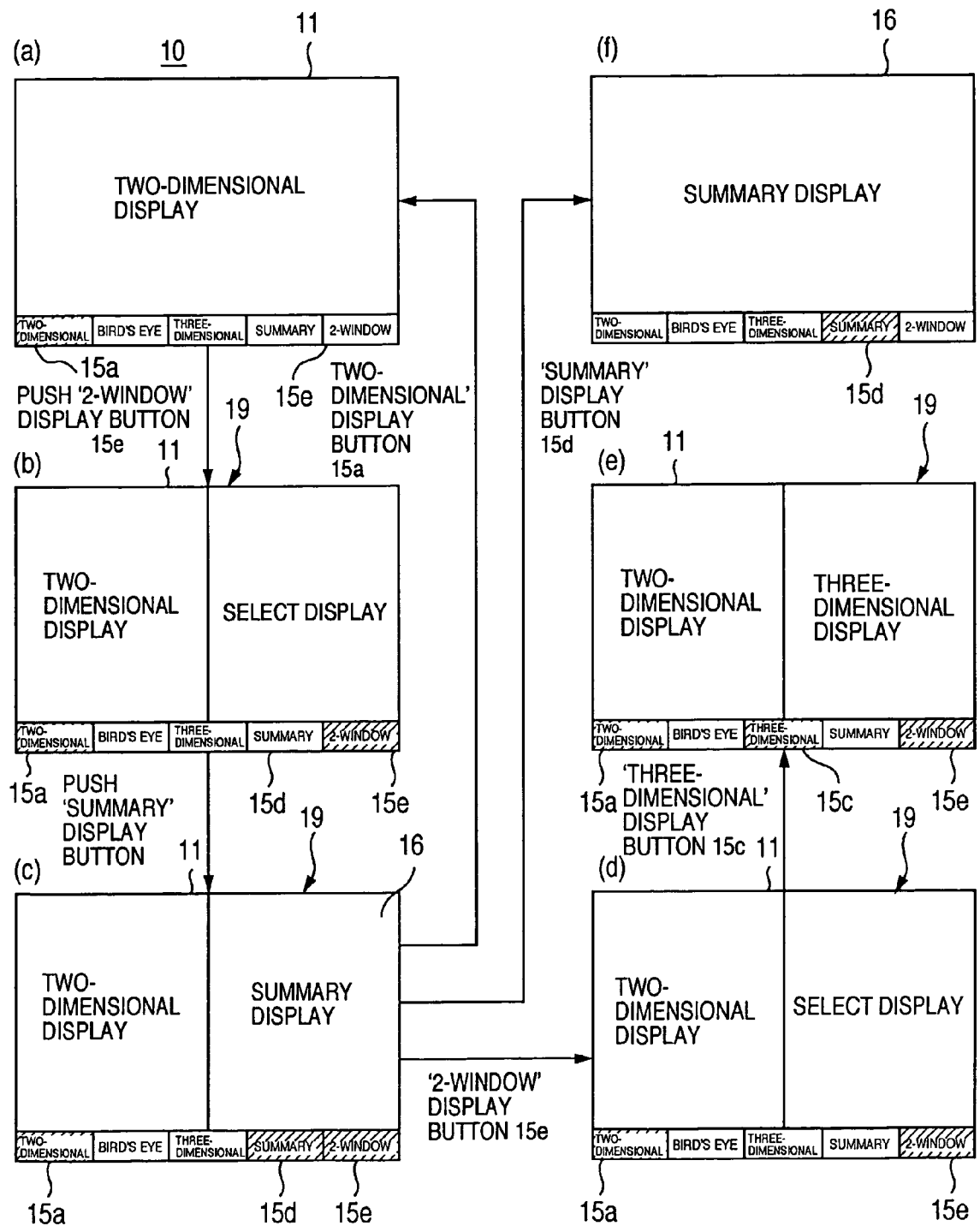
FIG. 7 shows a relationship between the display mode select buttons and 2-window display representations of the road map in the embodiment of FIG. 1.

FIG. 7 is a diagram for explaining the operation of the 2-window display mode.

Assume now that the two-dimensional road map 11 is displayed on the entire display screen 10 in a 1-window display mode as shown by (a) in FIG. 7. Under such a condition, the touch selection of the '2-window' display button 15e causes the display screen 10 to be divided into two left and right areas in a 2-window display mode 19, so that the display mode (in this case, the two-dimensional road map 11) so far displayed appears in the left-side area, whereas, such a guidance message as "select display mode" appears in the right-side area in place of the map, as shown by (b) in FIG. 7. In this connection, the so-far-displayed road map may be displayed in the left-side area. Next, the touch selection of, e.g., the 'summary' display button 15d causes the summary road map 16 to appear in the right-side area as shown by (c) in FIG. 7. In this way, the two-dimensional road map 11 and the summary road map 16 can be displayed simultaneously and thus the user can these maps simultaneously.

When the user wants to change the current 2-window display mode 19 to the 1-window display mode, the user is only required to selectively touch any desired one of the mode display buttons 15a to 15e. For example, the touch selection of the 'two-dimensional' display button 15a causes the two-dimensional road map 11 to appear in the 1-window display mode as shown by (a) in FIG. 7. The touch selection of the 'summary' display button 15d causes the summary road map 16 to appear in the 1-window display mode as shown in by (f) in FIG. 7. The same holds true even when the 'bird's eye view' display button 15*b* or the 'three-dimensional' display button 15*c* is selectively touched.

When the '2-window' display button 15*e* is selectively touched in the 2-window display mode as shown by © in FIG. 7, as shown by (d) in FIG. 7, this causes the display mode to be returned to a mode similar to (b) in FIG. 7, under which condition road map information can be displayed in the right-side area of the 2-window display screen 19 in the desired display mode. The touch selection of, e.g., the 'three-dimensional' display button 15*c* causes a three-dimensional road map 18 to appear in the right-side area as shown by (e) in FIG. 7, so that the user can see the two-dimensional road map 11 and the three-dimensional road map 18 at the same time.

In this manner, the user can see the road maps in two different display types simultaneously. However, when the user wants to see the road maps of usually two display types in the 2-window display mode, the user is only required as a general method to display one of the maps of the two display types in the 1-window display mode, to selectively touch the '2-window' display button 15*e* to obtain such a 2-window display mode as shown by (b) in FIG. 7, and then to selectively touch the display button of the other display type.

In the present embodiment, as has been mentioned above, the driver can clearly indicate the position of a facility desired by the driver on the road map on the way to the target position. And when the driver can display the desired facility position in an easy-to-see manner by displaying the summary road map. As a result, the driver can eliminate the labor of troublesomely finding such a facility while driving the vehicle. Further, maps having various characteristics including the summary road map can be combined to provide intended information.

By the way, the aforementioned summary road map 16 is a map covering only a local zone in the route from the departure position to the target position. Another specific example of the summary road map covering the full route will next be explained.

Figure 8:
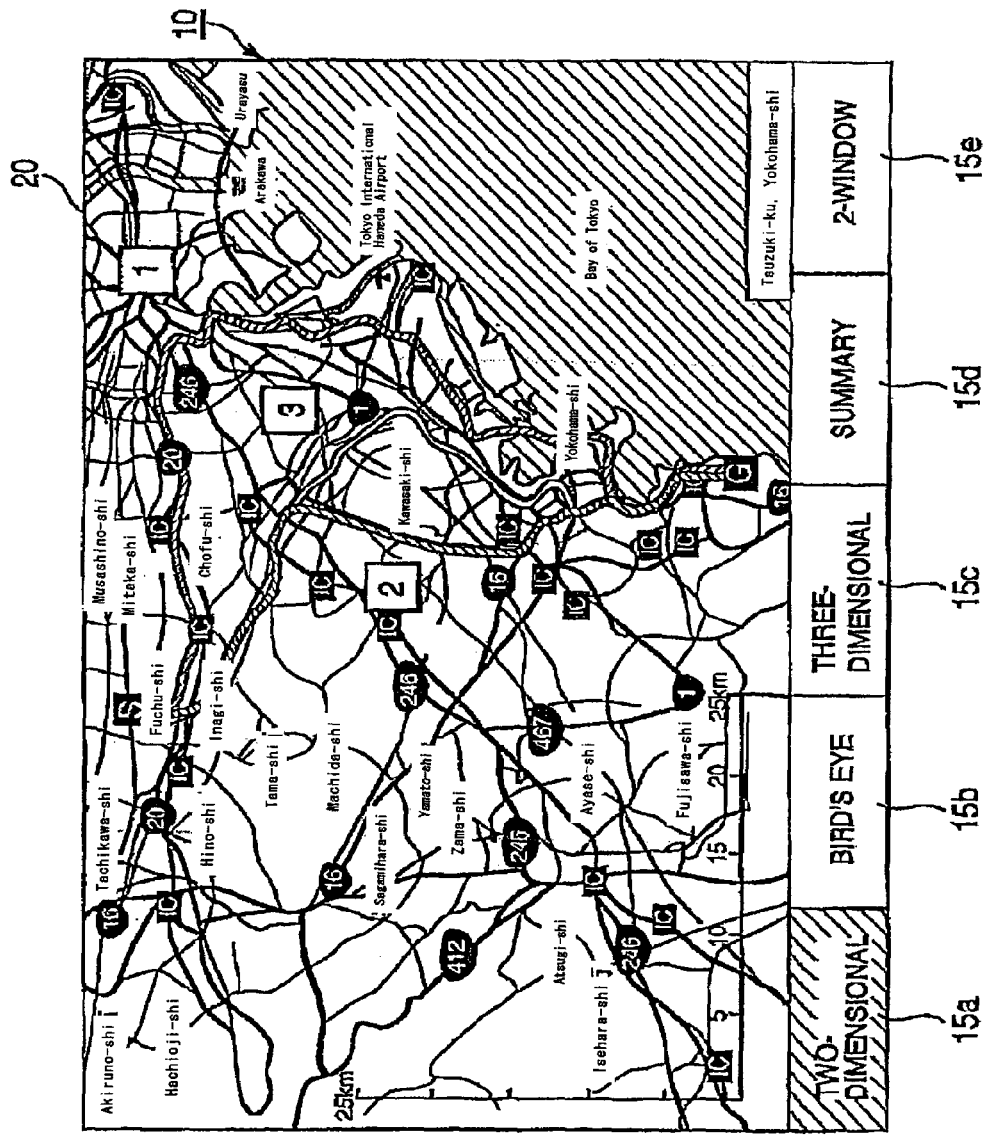
FIG. 8 shows another specific example of the two-dimensional road map in the embodiment of FIG. 1.

FIG. 8 shows a specific example of a two-dimensional road map 20 covering a full route, in which a departure position is denoted by 'S', a goal or target position is by 'G', and the searched full route is displayed as overlapped with the two-dimensional road map. When a plurality of courses exist from the departure position S to the target position G, these courses may be displayed at the same time. In this example, it is assumed as an example that the departure position S is Kokubunji Station (国分寺駅), the target position G is Hakkeijima (八景島) and three courses or routes 1, 2 and 3 exist. And in this example, the plurality of routes are assumed to be displayed as distinguished from each other by different line types or colors.

Such a two-dimensional road map 20 is displayed on the display screen 10 for confirming a result of route searching as when the driver sets a route at the car navigation system. When the driver selects the route on the display screen, the route is set and the car navigation system starts to guide the vehicle along the route. It is assumed in this case that the route selected by the driver is displayed at the forefront of the screen or as distinguished from other routes by making the line of the selected route thick or changing the color of the route or the like. It is also assumed that, even after the route guiding operation of the car navigation system is started, touching of an operational button (not shown) can cause the two-dimensional road map 20 to appear on the display screen 10. In this case, in addition to the departure position S and the target position G, the position of the vehicle may be displayed. This helps the driver to change the route on the way during the running directed to the target position.

When using such a two-dimensional road map 20, the user can briefly grasp the state of the entire route. However, the user cannot grasp in detail each location in the route through which the vehicle passes. The summary road map in the above specific example is used so that the driver can clearly grasp each location located on the way of the route.

Figure 9:
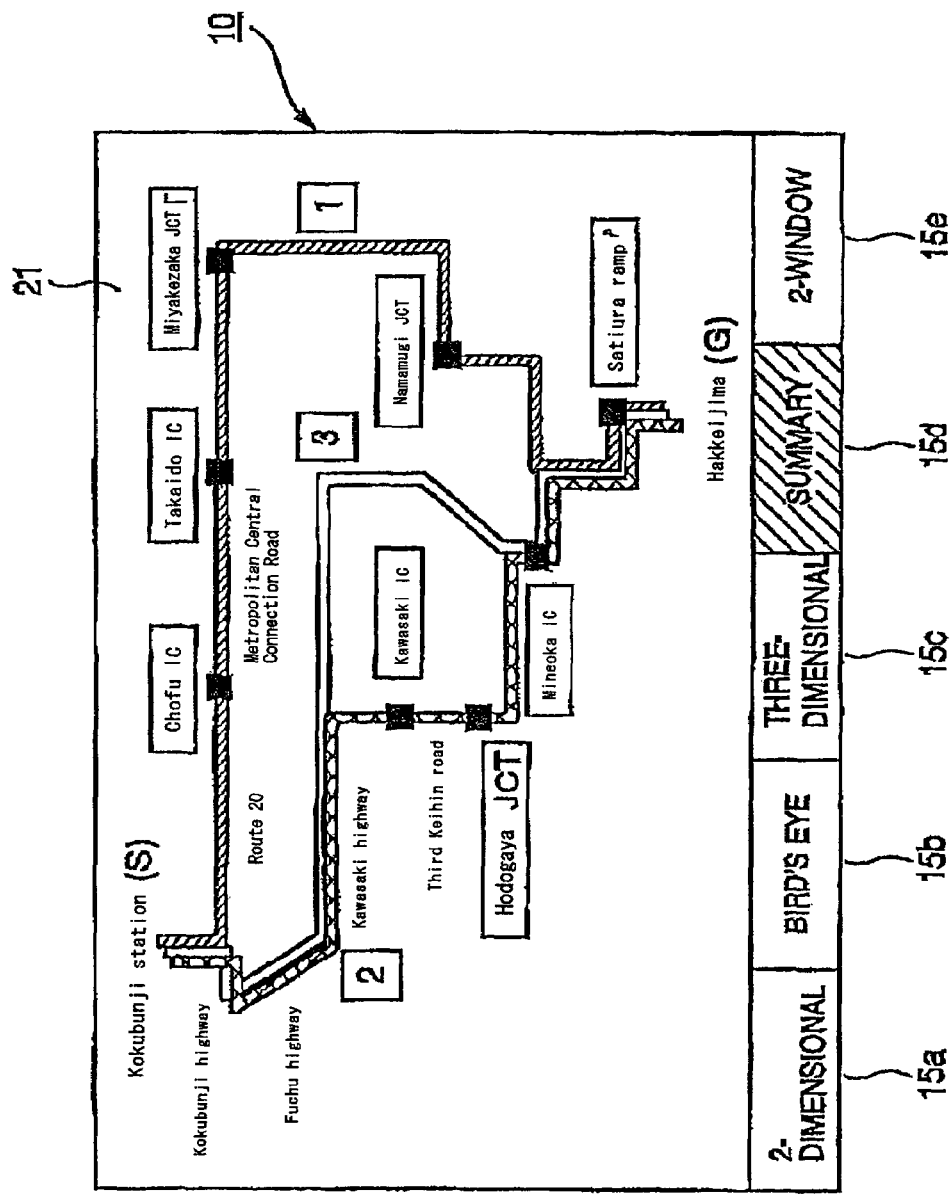
FIG. 9 is another specific example of the summary road map in the embodiment of FIG. 1.

When the user selectively touches the 'summary' display button 15*d* under a condition that such a two-dimensional road map 20 as shown in FIG. 8 is displayed, a summary road map 21 for the two-dimensional road map 20 appears as shown in FIG. 9. In the summary road map 21, only the routes are clearly shown by broken lines, a main location such as an interchange and road titles for the vehicle to pass through are extracted and indicated along the routes, the routes are also created based on the map and thus general positional relation therebetween is also saved. Based on the summary road map, the user can clearly know any place where the vehicle passes.

In this connection, traffic information about traffic jam, road under construction etc. received by the communication device 4 (see FIG. 1) may be displayed on the summary road map 21 as overlapped therewith. When the summary display mode is used, such additional information as mentioned above can be displayed so that the driver can be easily see the information, and can be provided as helpful information when the driver selects the routes. Even in the route guidance after the driver selects one of the routes, a plurality of the other routes can be effectively displayed. For example, when traffic jam information is obtained for the route selected by the driver, the driver can easily change it to one of the other routes being displayed simultaneously.

Further, such a road map in the vicinity of the current position as shown in FIG. 2 can be displayed together with the summary of the full route. However, the summary road map shows the summary of the full route as shown in FIG. 9. Explanation will be made in connection with a case where the route 2 is selected.

Figure 10:
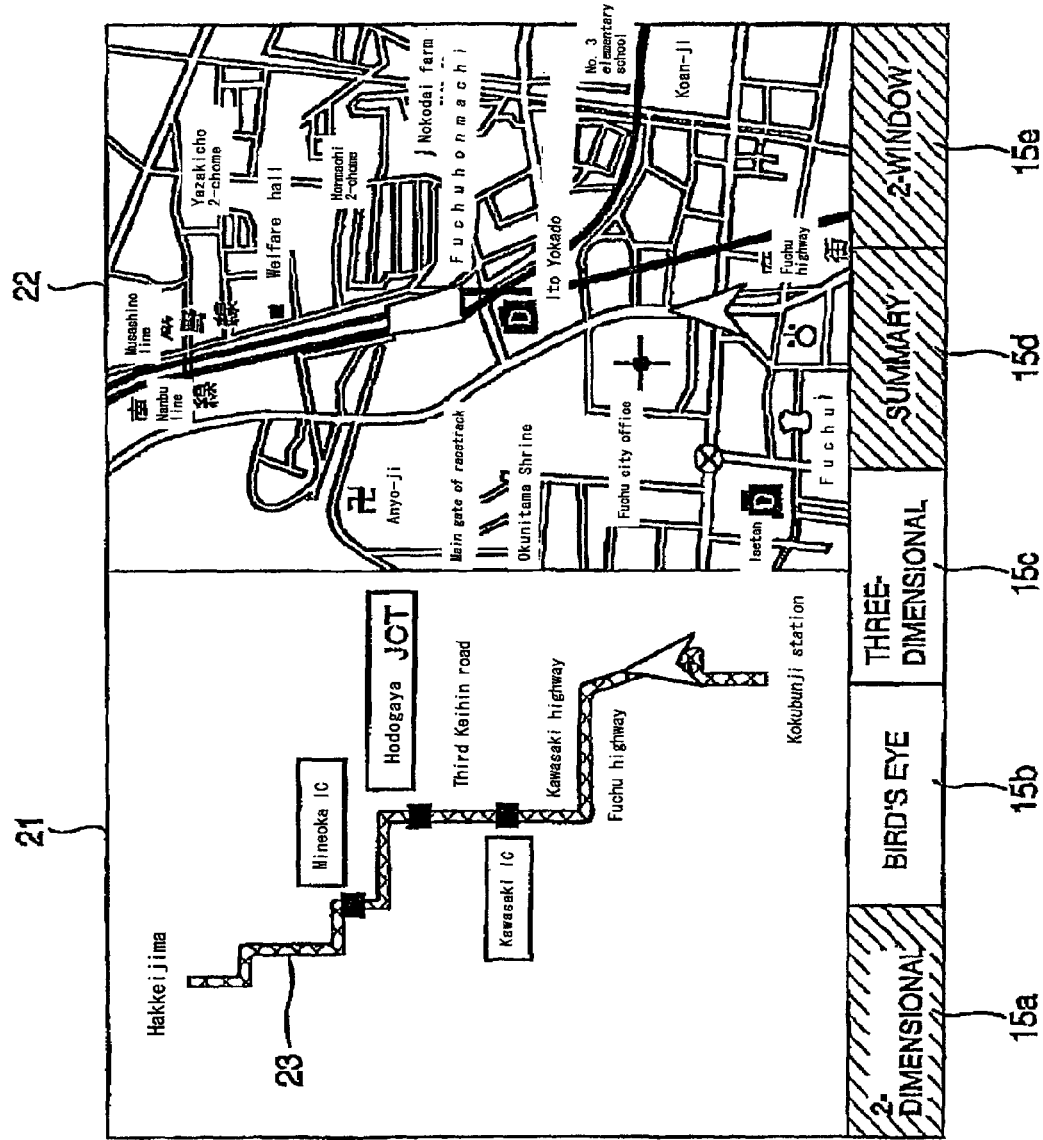
FIG. 10 is another specific example of the two-window display representation in the embodiment of FIG. 1.

When the 2-window display mode including the summary road map is used as in the foregoing specific example, for example, a two-dimensional road map 22 is displayed in one of areas as two divisions of the display screen, and the summary road map 21 indicative of a full route 23 is displayed in the other area, as shown in FIG. 10. The full route 23 shown in the summary road map 21 is selected by the driver. When the vehicle is running, navigation of the current position becomes necessary.

Figure 11:
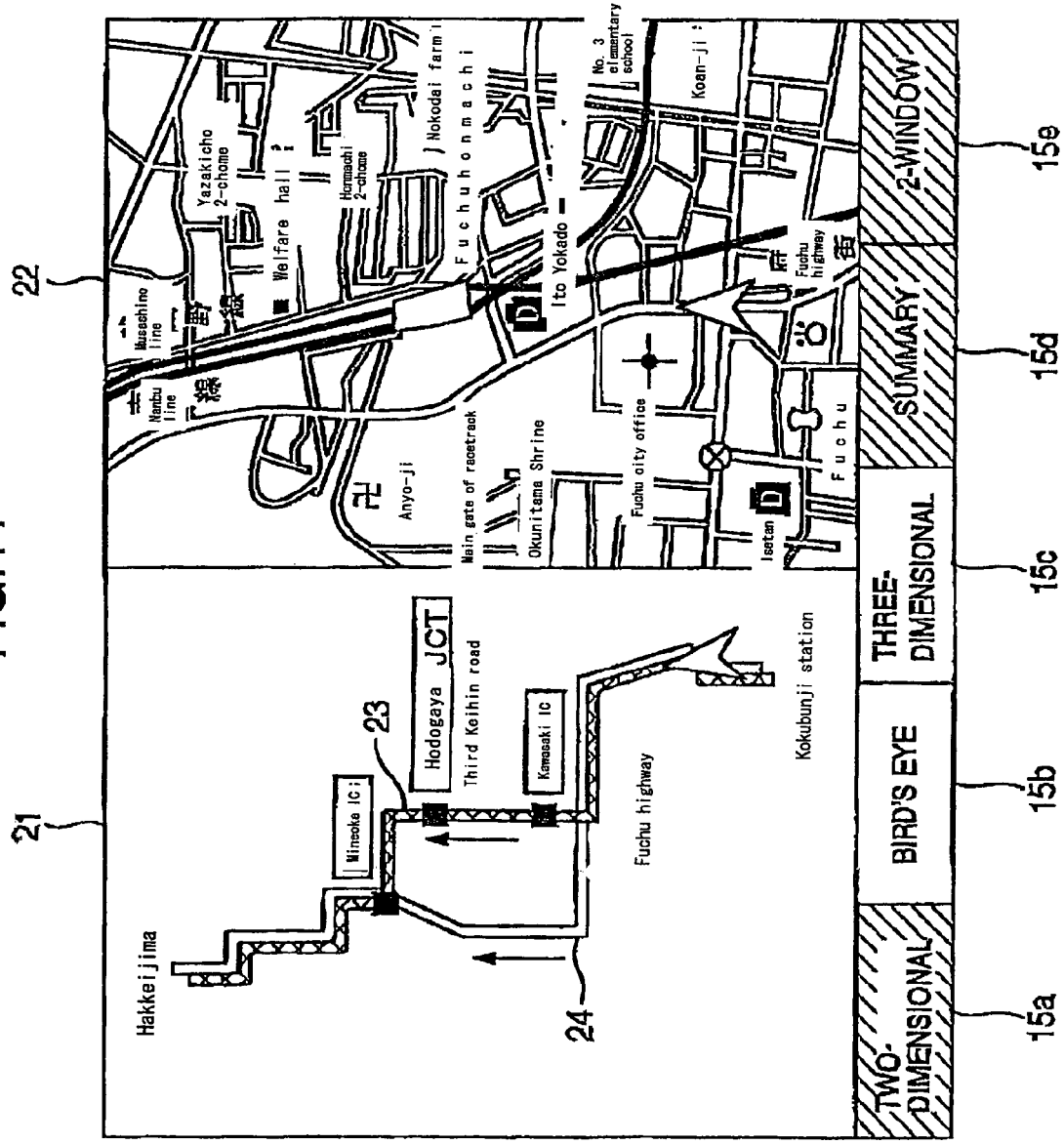
FIG. 11 shows a summary road map appearing when a traffic jam or the like took place on the 2-window display representation of FIG. 10.

When traffic information about a traffic jam or the like in the driver-selected route which blocks the passage of the vehicle is received from the communication device 4 (see FIG. 1), a location on the full route 23 where the traffic jam is present is displayed on the full route 23 as shown in FIG. 11. Simultaneously with the above, another route which the vehicle running from the current position can use may be displayed as a detour 24. The detour 24 may be one of the routes 1 and 3 shown in FIG. 9 or be a route again searched for based on the current position. In this case, the fact of the route change may be announced from the voice input/output device 8 (see FIG. 1). Thereby the driver can immediately take an action to avoid such a traffic jam.

Under a condition that the road map or maps are displayed in the 1-window or 2-window form in the display mode other than the summary road map display mode, when the system receives traffic information leading to running blockage of the vehicle in the currently passing route from the communication device 4, this automatically causes such a summary road map 21 as shown in FIG. 9 to appear in the 1-window form and causes such a summary road map 21 as shown in FIG. 11 to appear in the 2-window form. And when the current route is shifted to the detour, the current display can be automatically returned to the original display state.

In the specific example, in this manner, the driver can easily grasp any passage location on the running route on the basis of the summary road map 21. When such a trouble as a traffic jam causing hindrance of vehicle passage takes place, the driver can immediately cope with it, thus realizing smooth vehicle passage.

Figure 12:
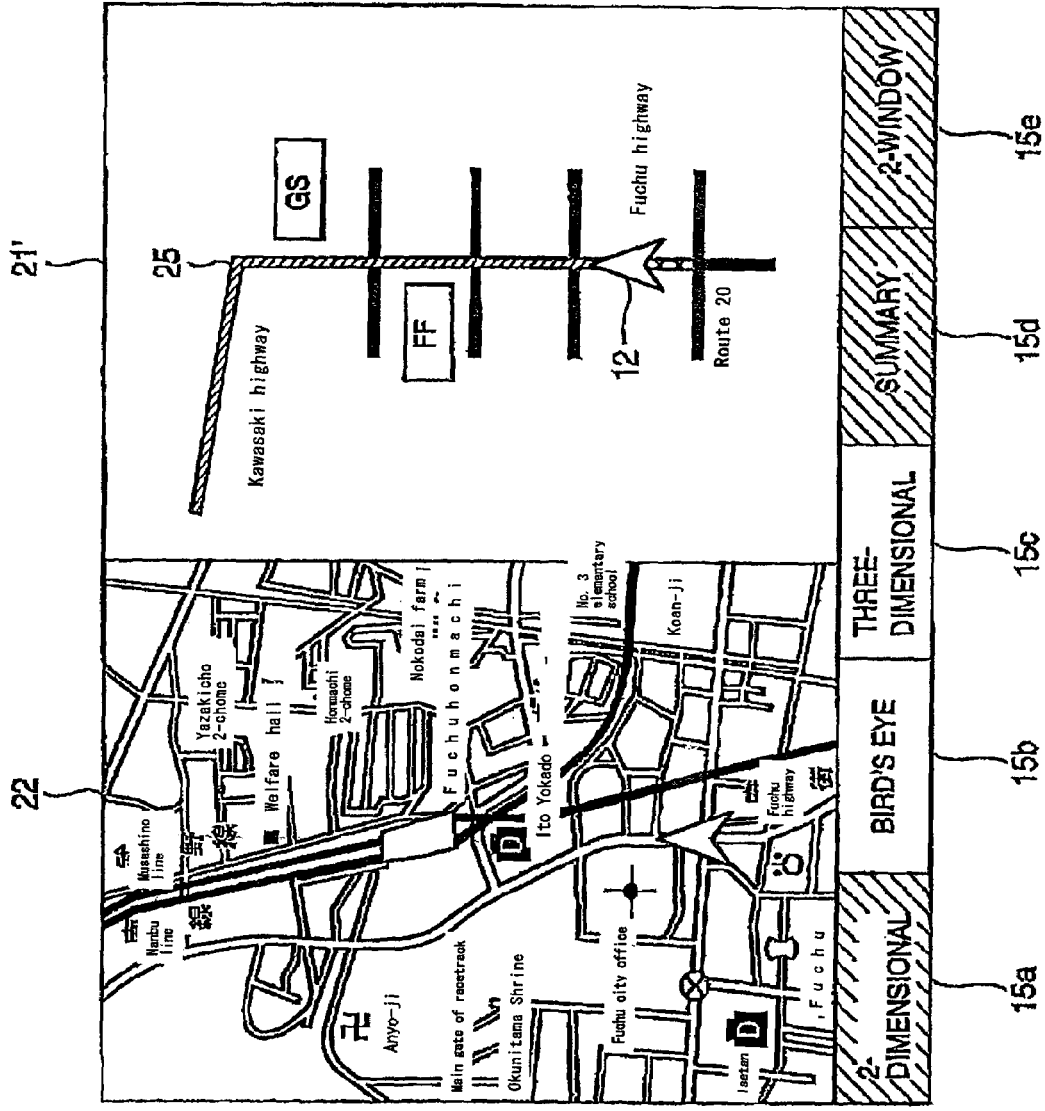
FIG. 12 shows a summary road map when a vehicle approaches an intersection on the 2-window display representation.

When the vehicle proceeds directly straight in an intersection, this causes no problem. When the vehicle turns right or left in the intersection (which will be referred to as the main intersection, hereinafter), however, a summary road map 21' is displayed to guide the vehicle in the main intersection as shown in FIG. 12. The summary road map 21' is displayed as the vehicle approaches a main intersection 25 by a predetermined distance therefrom. A magnified map of the main intersection covering a predetermined range (e.g., within 400M) and including the intersection located at its center is usually previously prepared. In this case, when the vehicle enters the vicinity of the intersection, the magnified road map covering the range can be displayed on the display screen 10 as a two-dimensional road map. In the technique of the present invention, on the other hand, the summary road map 21' can be displayed even when the vehicle approaches the main intersection 25 by a distance (e.g., 1 km) much away therefrom. In the summary road map 21', not only roads but main buildings are simultaneously displayed as marked, whereby the driver can easily know the state of the course until the main intersection 25. In this way, since a summary up to a main intersection to be next guided is displayed in the summary road map, even when the vehicle is located far away from the next turning corner, the driver can know the summary up to the corner. Such an intersection as to be guided can be set at a location on the route where the vehicle must turn right.

In the case where the summary road map 21 of the full route 23 is displayed in the 2-window display form as shown in FIG. 10, when the vehicle arrives at a position spaced from the above main intersection 25 by the predetermined distance, the road map 21 is automatically switched to the summary road map 21'. And when the vehicle leaves away from the main intersection 25 by the above distance or more, the summary road map 21' is automatically returned to the original display state, that is, to such a display state as shown in FIG. 10 is this case.

In this way, even with regard to such a main intersection, since the summary road map 21' is displayed, the vehicle can pass through the main intersection smoothly.

FIGS. 10 to 12 show the two-dimensional road map 22 in the 2-window display mode. However, the two-dimensional road map 22 may be replaced by the bird's eye view road map or three-dimensional road map, as in the above case.

Explanation will now be made as to how to prepare the aforementioned summary road maps 16, 21 and 21'.

Figure 13:
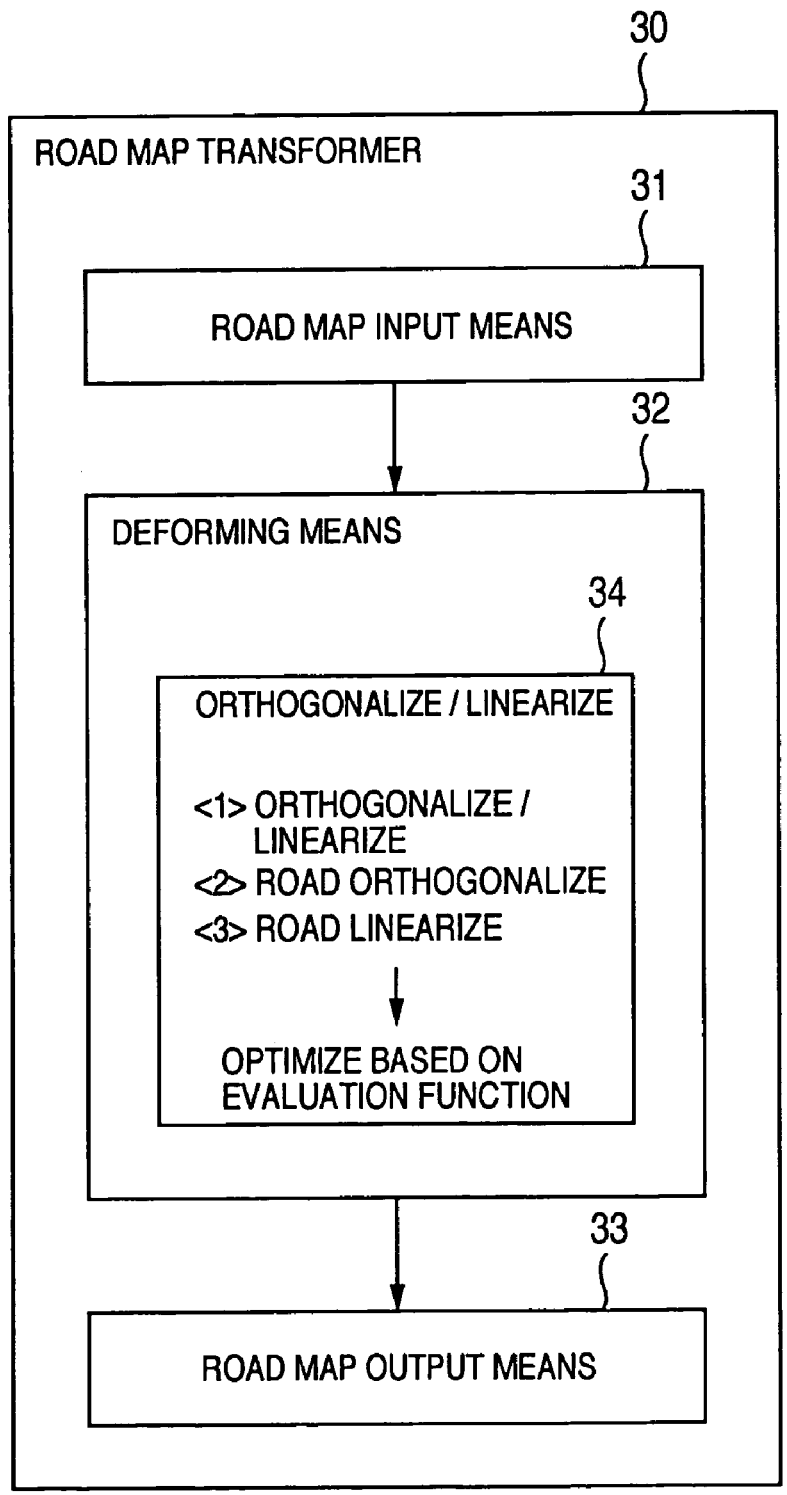
FIG. 13 is a functional block diagram of a specific example of a road map transformer in the present invention.

FIG. 13 is a functional block diagram showing a specific example of a road map converting device provided in the controller 1 (see FIG. 1) for preparing a summary road map.

In the specific example, it is assumed that a road map is an element in a map to be deformed, a background map indicates an element in a map other than the background map, and the road map may include elements such as railway and river other than road.

In FIG. 13, a road map transformer 30 has a means 31 for inputting a stored road map, a deforming means 32 for deforming the road map, and a means 33 for outputting the deformed road map.

The deforming means 32 sets nodes including end points and inflection points in the road map as an initial layout or arrangement, and executes orthogonalizing/linearizing operation 34 to repeat an optimizing loop for rearranging the nodes on the basis of an evaluation function having a first term indicative of saving of road length and a second term indicative of orthogonalization of roads until the convergence condition of the evaluation function is satisfied. In this example, the final target of the orthogonalizing/linearizing operation 34 is set (1) to save the road length with its initial value as possible (saving of the road length), (2) to make an intersected angle of roads as at right angle as possible (road orthognalization), and (3) to make a road along which the vehicle runs as linear as possible (road linearization).

To this end, the optimization is carried out on the basis of an evaluation function $E(=E1+E2+E3)$ having (1) a term $E1$ indicative of road length saving, (2) a term $E2$ indicative of road orthogonalization, and (3) a term $E3$ indicative of road linearization.

Figure 14:
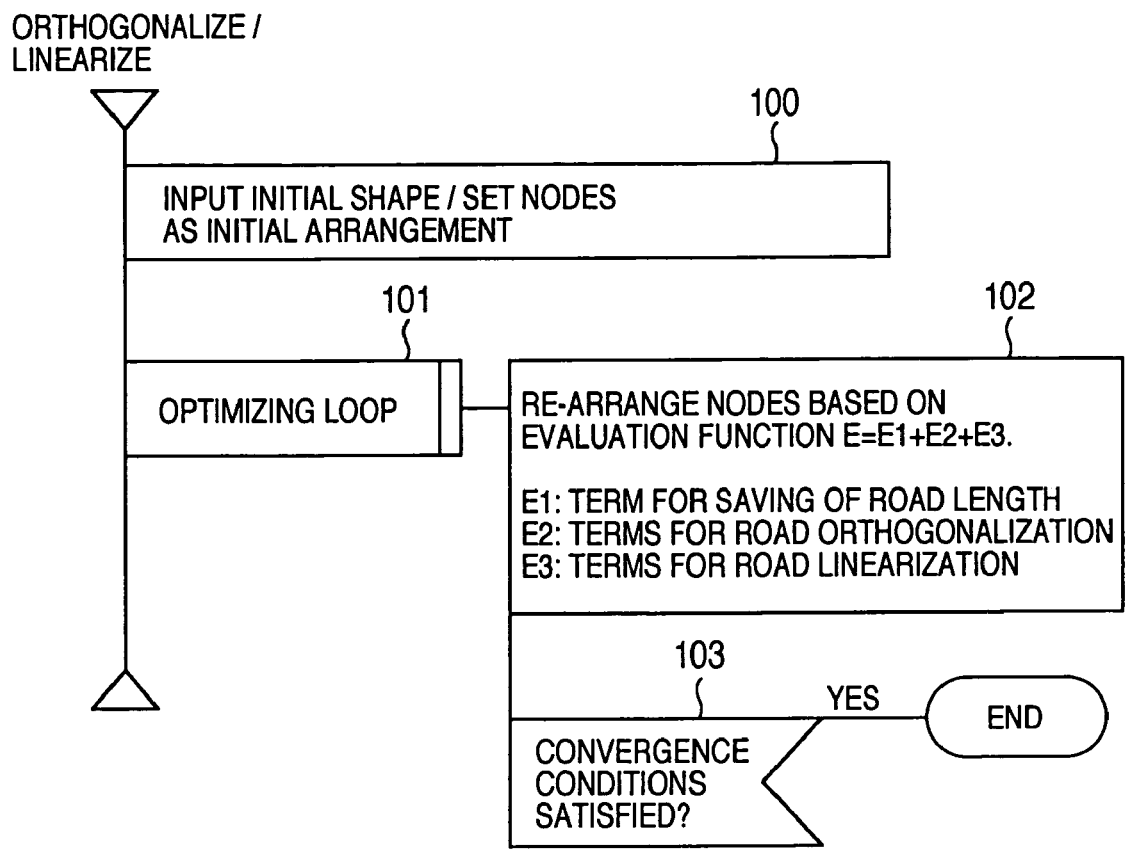
FIG. 14 is a flow chart showing a specific example of flow in orthogonalizing/linearizing operation in FIG. 13.

As shown in FIG. 14, in the orthogonalizing/linearizing operation 34, the user first enters the initial configuration of a road map via the road map input means 31 and sets it as the initial arrangement of nodes including its end and inflection points (step 100), after which control proceeds to the next optimizing loop (step 101). In the optimizing loop, a step 102 of rearranging the nodes on the basis of the evaluation function E having the first term $E1$ of the road length saving, the second term $E2$ of road orthogonalization, and the third term $E3$ of the road linearization as well as a step 103 of judging whether or not the convergence condition of the function is satisfied are repeated until the convergence condition is satisfied. As a result, the road length is saved with its initial value as possible, the intersected angle of roads is made as at right angle as possible, and a road along which the vehicle proceeds is made as liner as possible.

It is assumed now that the road along which the vehicle proceeds indicates a road having a high probability that the vehicle proceeds straight at an intersection. And, when one of combinations of the roads and intersections has a minimum elevation angle difference at the intersection and the elevation angle difference is small, it is judged that the road has a high linearization probability. The orthogonalizing/linearizing operation 34 finds an optimum node arrangement while rearranging the nodes according to the evaluation function E. Thus even a topology having a plurality of tangled roads crossing each other can be effectively modified.

The evaluation function E is set so that the term $E1$ of the road length saving saves a road length with its initial value as it is as possible, for example, when the road length is the initial value, the function has a minimum value.

Similarly, the second term $E2$ of road orthogonalization is set so that a road intersection angle becomes as a right angle as possible, for example, the function has a minimum value when the road intersection angle has an ideal value. If the ideal angle is a value obtained by normalizing the initial angle in units of 90 degrees and a sum of intersection angles around the node becomes 360 degrees, that is, if the topology saving condition is not satisfied, then the topology saving condition is set to be as satisfied as possible, for example, by again normalizing the initial angle with an angle of half thereof or by another means.

Similarly, the third term $E3$ of road linearization is set so that a road along which the vehicle travels is made as linear as possible, and so that the function has a minimum value when an intersection angle becomes, e.g., 180 degrees in combinations of roads having high linearization probabilities. In the judgment of linearization probability of at the intersection, the linearization probability is judged as high, for example, when a difference between elevation angles in combinations having the minimum elevation angles is not larger than a threshold value. As the third term E3 of the evaluation function E indicates itself, the third term is intended not to normalize the direction of a road but to make the road as linear as possible. Thus the present invention can solve the problem that different results are produced depending on the different initial orientations of the map, and thus the map can be modified independently of coordinate rotation.

The evaluation function E is set as follows. More specifically, as shown in FIG. 15, the first term E1 for road length saving is calculated as a sum of the terms corresponding to links connected between nodes, the second term E2 for road orthogonalization is calculated as a sum of the terms corresponding to relative angles between adjacent links, and the third term E3 is calculated as a sum of the terms corresponding to ones of the relative angles between ones of the links judged as the vehicle proceeding straight at the node having 3 or more links connected thereto.

The terms corresponding to the links connected between the nodes are assumed to be set as a function having a minimum value, for example, when the link length has its initial value; while the terms corresponding to the relative angles between the adjacent links are assumed to be set as a function having a minimum value, for example, when the relative angle has an ideal value. Further, the terms corresponding to the relative angles between the links judged as high in linearization probability are set as a function having a minimum value, for example, when the relative angle is 180 degrees. As a result, the terms corresponding to the links connected between the links, the terms corresponding to the relative angles between the adjacent links, and the terms corresponding to the relative angle between the links judged as high in the linearization probability at the intersection can be evaluated synthetically. As a result, the overall road map can be modified in well-balanced manner without any contradiction.

Further, since weight coefficients for the terms in the third term E3 of road linearization are set depending on the road with, the weight coefficients can be set to be large when the road width is large and to be small when the road width is small. Thus such a demand that the preferential linearization of roads having large road widths can be realized. In this connection, when weight coefficients are set for the respective terms, a road type, etc. in place of the road with may be used for the setting.

When the evaluation function E is set, further, the respective weight coefficients of the first term E1 of road length saving, the second term E2 of road orthogonalization, and the third term E3 of road linearization are varied according to the repetition frequency of the optimizing loop (step 101 in FIG. 14), thereby changing the priorities of the terms according to the repetition step. As a result, the priorities of the terms can be controlled by the repetition step, so that, even when a contradiction arises between the road length saving, road orthogonalization, and road linearization, the contradiction can be removed and thus an effective deformed result can be obtained.

Figure 16:
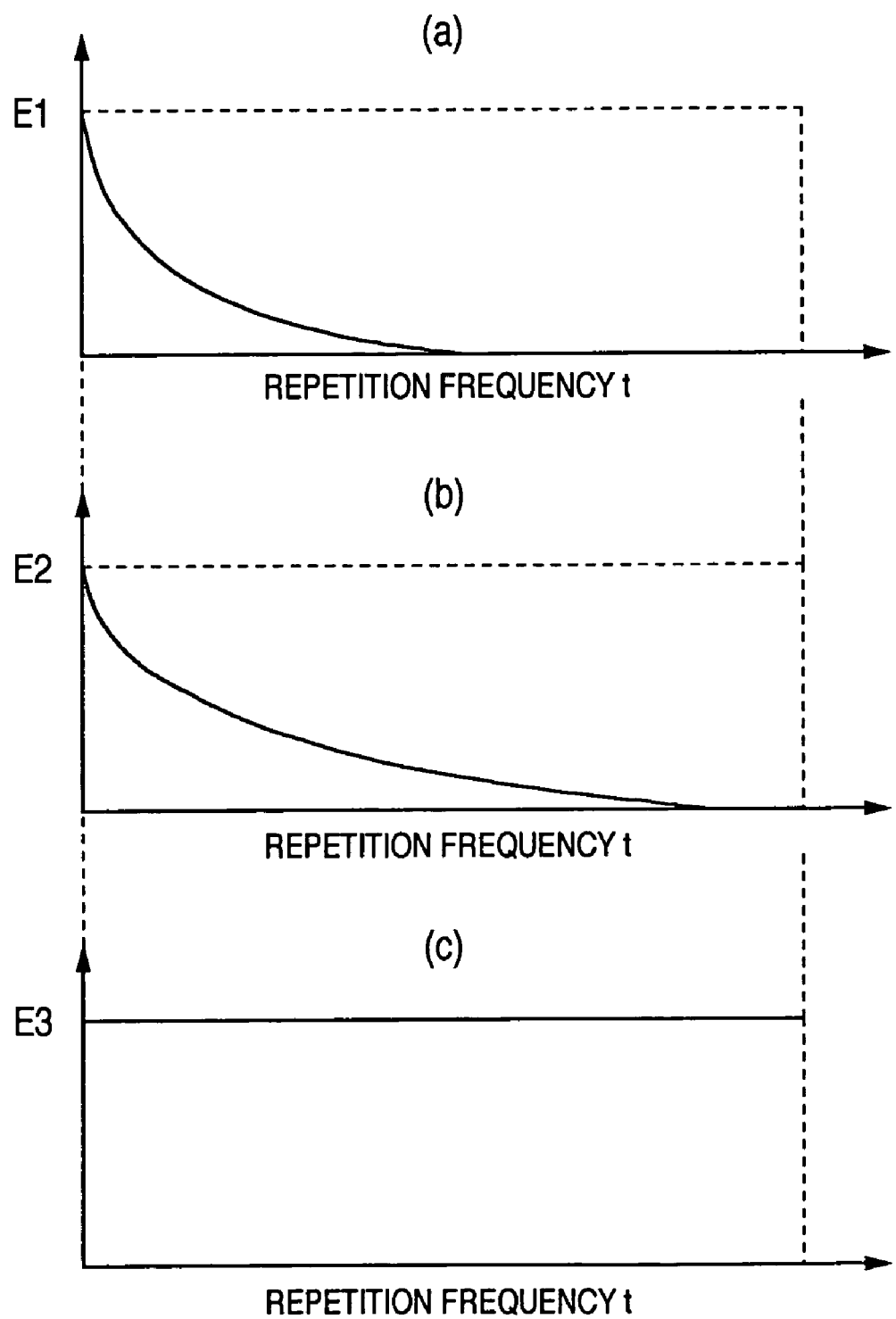
FIG. 16 shows a specific example when weight coefficients for terms of the evaluation function shown in FIG. 14 are varied according to a repetition frequency.

FIG. 16 shows specific examples when the coefficients of the terms E1 to E3 are varied according to the repetition frequency. More in detail, FIGS. 16A, 16B and 16C show dependencies of the first, second and third terms E1, E2 and E3 of road length saving, road orthogonalization and road linearization on the repetition frequency, respectively. In this examples, while the weight coefficient of the third term E3 is kept constant, the weight coefficients of the first and second terms E1 and E2 are attenuated according to the repetition frequency. Further, the first term E1 is attenuated more quickly than the second term E2, the road linearization is set to have the highest priority, the road linearization is to have the second priority, and the road orthogonalization is to have the third priority. As a result, such a demand that the road linearization have the highest priority, and the road orthogonalization be set to be preferential to the road length saving can be realized.

Explanation will then be made in connection with a specific example of the structure of the deforming means 32 in the road map transformer 30 (FIG. 13).

Figure 17:
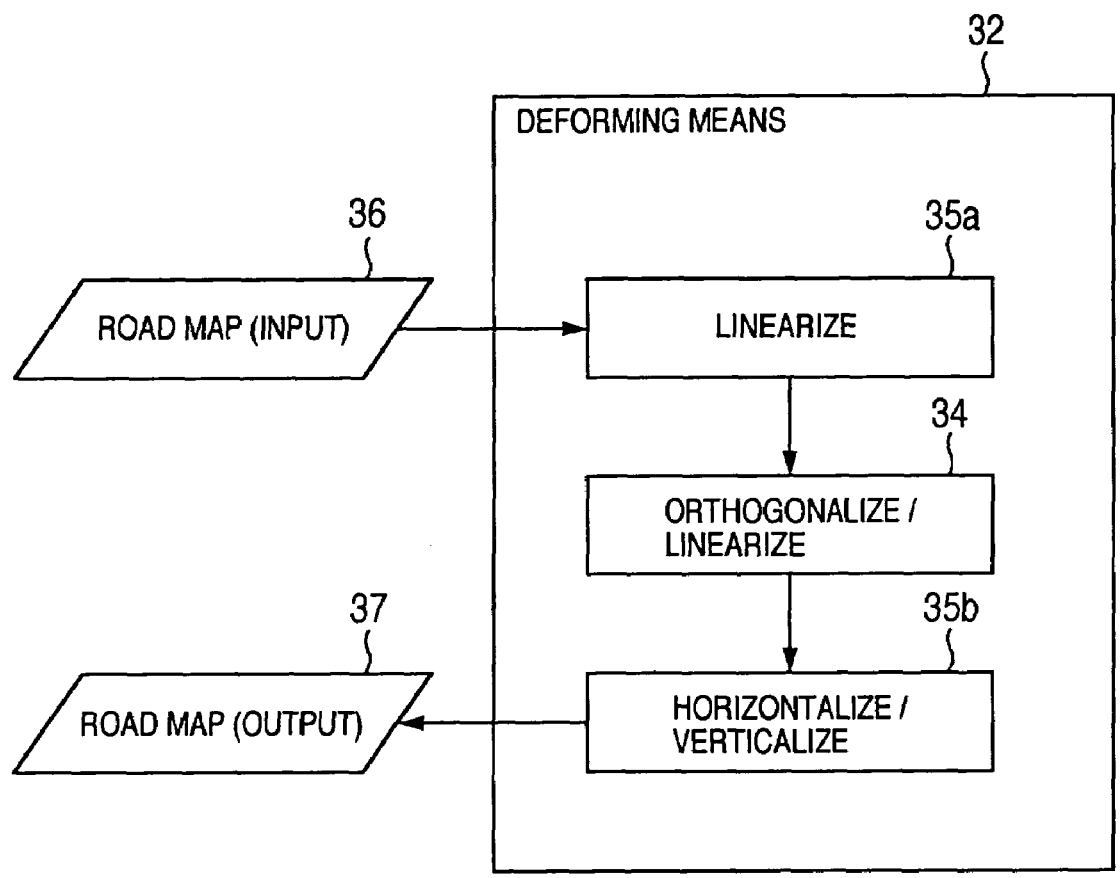
FIG. 17 shows a specific example of deforming operation in FIG. 13.

FIG. 17 is a functional block diagram showing a specific example of the deforming means 32.

In the processing of the specific example of the drawing, a road map 36 is input and a road map 37 is output. More specifically, the deforming means 32 has, in addition to the orthogonalizing/linearizing operation 34 shown in FIG. 13, a linearizing operation 35a of decimating inflection points on a broken line indicative of a road shape while minimizing a change in the road shape caused thereby, and a horizontalizing/verticalizing operation 35b of rotating a coordinate system so that the road is positioned as horizontally or vertical as possible to correct a very small positional misalignment. The input road map 36 is subjected to the linearizing operation 35a, orthogonalizing/linearizing operation 34 and horizontalizing/verticalizing operation 35b in this order. This results in an improved visibility and a reduced data amount.

Since the linearizing operation 35a decimates the inflection points while minimizing the change of the road shape, the data amount can be reduced without deteriorating information necessary when the user (vehicle driver or passenger) uses the navigation system. Further, by decreasing the number of nodes in a road map to be subjected to the orthogonalizing/linearizing operation 34, a calculation load can be lightened.

The horizontalizing/verticalizing operation 35b modifies roads in such a manner that the roads are located as horizontally or vertically as possible. Therefore, when the present system is used in such a display device having a low resolution as a portable telephone, jaggy edges appearing in an oblique line can be remarkably reduced. When the coordinate system is rotated so that roads are located to be as horizontally or vertically as possible, for example, a most aligned road direction from road directions weighted by considering the road width and road length is found through histogram analysis and set horizontally or vertically, the rotational angle is determined.

Figure 18:
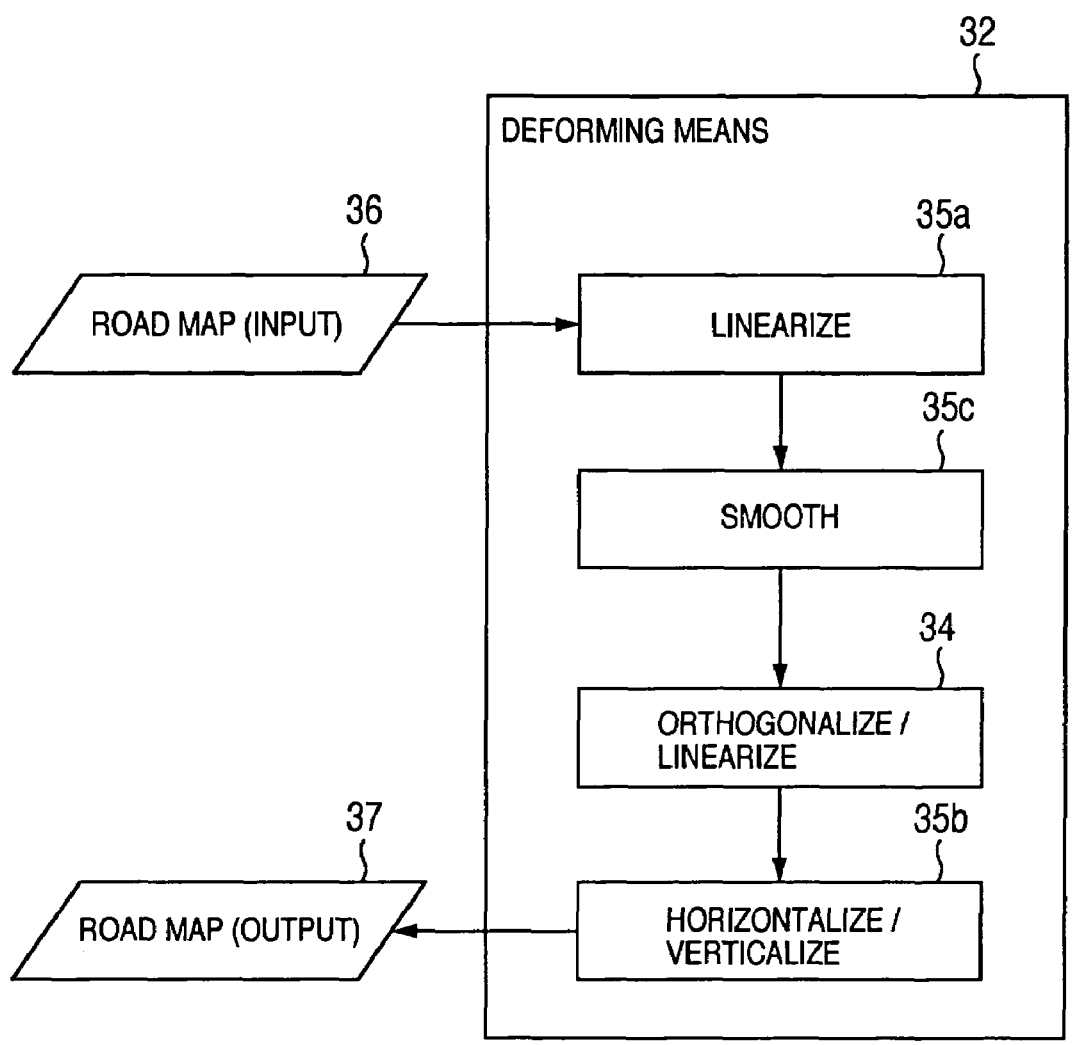
FIG. 18 shows another specific example of the deforming operation in FIG. 13.

FIG. 18 is a functional block diagram of another specific example of the deforming means 32.

In the specific example of the drawing, a smoothing operation 35c for smoothing the width of a road along which the vehicle proceeds is added in the example of FIG. 17. When the linearizing operation 35a, smoothing operation 35c, orthogonalizing/linearizing operation 34, and the horizontalizing/verticalizing operation 35b are executed in this order, the visibility can be further improved.

Since the smoothing operation 35c for smoothing the width of a road having a high linearization probability can align widths of roads to be located horizontally or vertically in the eventual deformed result, the visibility can be additionally improved. In this case, when the road widths are smoothed, the widths are averaged, for example, by weighting the road widths by the road lengths.

Figure 19:
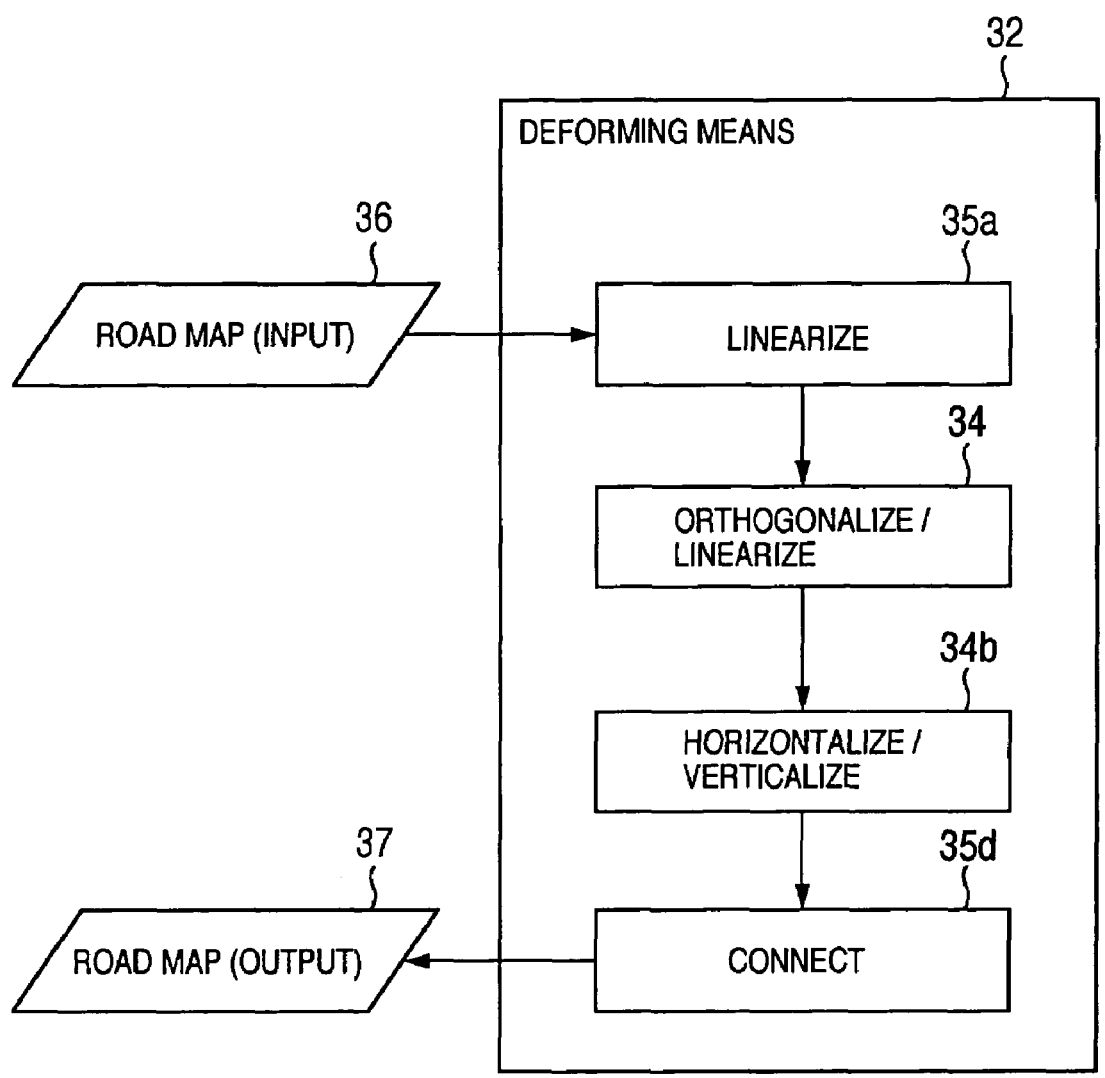
FIG. 19 shows a further specific example of the deforming operation in FIG. 13.

FIG. 19 is a functional block diagram of a further specific example of the deforming means 32.

In the specific example of the drawing, a connecting operation 35d, for connecting a road along which the vehicle proceeds to an intersection and, when the road has a high linearization probability, for removing the intersection, is added in the example of FIG. 17. When the linearizing operation 35a, orthogonalizing/linearizing operation 34, horizontalizing/verticalizing operation 35b, and connecting operation 35d are executed in this order, a data amount can be further reduced. In a road map to be subjected to the connecting operation 35d, since roads along which the vehicle proceeds are made straight or linear through the orthogonalizing/linearizing operation 34, the connecting operation 35d can decimate and reduce the number of connection points to a large extent and thus the data amount can be additionally decreased.

Although the above explanation has been made in connection with the typical structure examples of the deforming means 32, the deforming means 32 may be arbitrarily combined with any of at least the linearizing, smoothing, horizontalizing/verticalizing and connecting operations.

Explanation will next be made in detail as to the linearizing operation 35a, horizontalizing/verticalizing operation 35b, smoothing operation 35c, and connecting operation 35d as the constituent elements of the specific examples of the deforming means 32 shown in FIGS. 17, 18 and 19.

Figure 20:
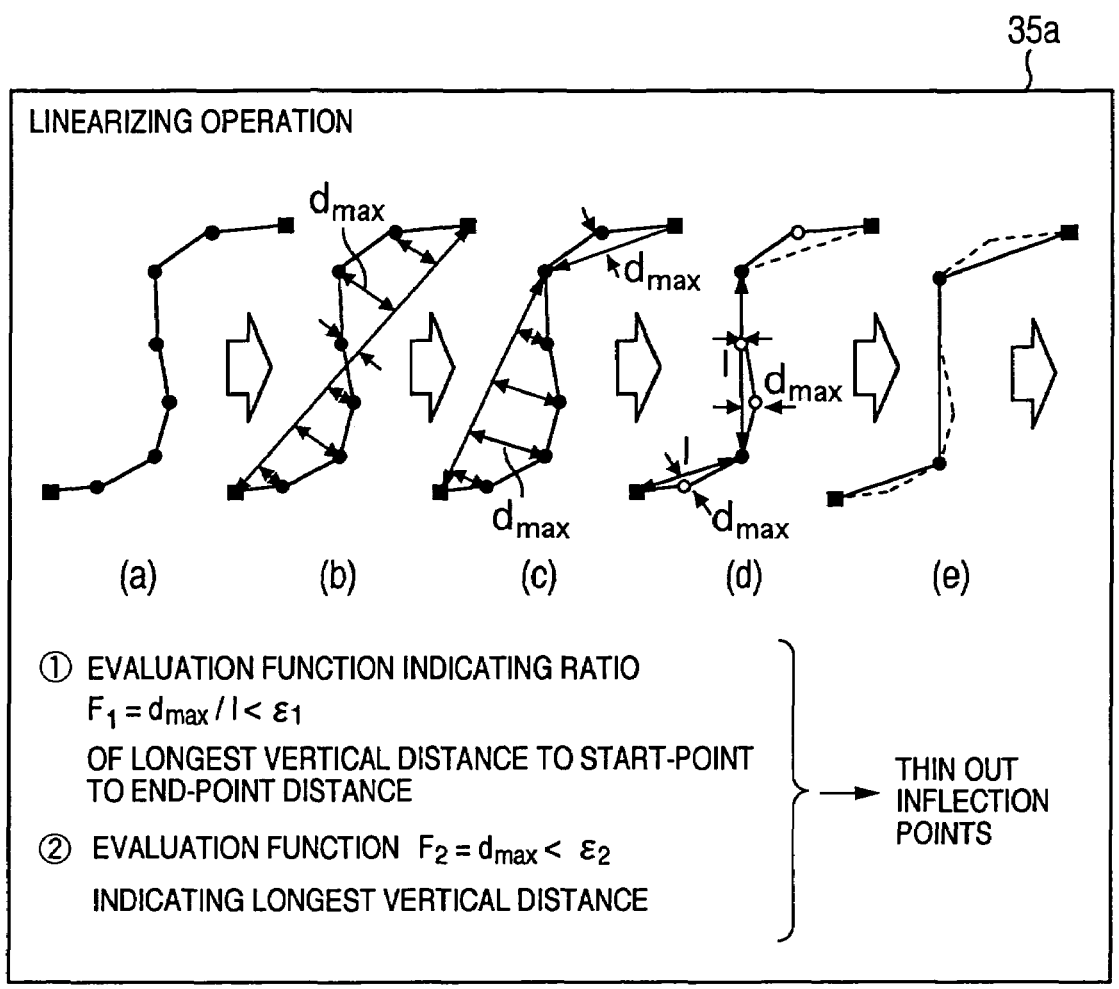
FIG. 20 shows a specific example of a linearizing operation in FIGS. 17 to 19.

FIG. 20 shows a specific example of the linearizing operation 35a in FIGS. 17 to 19. In the example of FIG. 20, each of the shapes of roads included in a road map is expressed by a broken line having an intersection or as its end point, and the linearizing operation 35a performs its linearizing operation over the lines on a line-by-line basis.

In FIG. 20, (a) shows a broken line for the shape of the input road map 36. In the linearizing operation 35a, the start point and end point (shown by ■) must be first left. As shown by (b) in FIG. 20, next, a inflection point (shown by ●) on the broken line spaced by a longest vertical distance $d_{max}$ from a straight line connected between the-left start and end points. When the value of the evaluation function E with respect to the inflection point is not larger than a threshold value, the inflection point is removed or decimated. When the value of the evaluation function E is larger than the threshold value and the inflection point is left, straight lines are drawn between the inflection point and the start and end points, and an inflection point on the broken line as spaced by the longest vertical distance $d_{max}$ from the straight lines is found, as shown by (c) in FIG. 20. When the value of the evaluation function E for the found inflection point is not larger than the threshold value, the inflection point is decimated. And as shown in FIG. 20, (d), the linearizing operation is completed for line segments satisfying the decimating condition; while the similar operation is repeated for a line segment not satisfying the decimating operation until the condition is satisfied. Eventually such a broken line as shown by (e) in FIG. 20 is obtained.

As illustrated, the evaluation function for use in the judgment of the decimating condition includes a first evaluation function $F_1$ expressed as a ratio of the longest vertical distance $d_{max}$ to a distance 1 between the start and end points, and a second evaluation function $F_2$ indicating the longest vertical distance $d_{max}$ itself. The first evaluation function $F_1$ offers the decimating operation independent of the scale. Thus for the same line shape, even broken lines having different scales can be expressed as a broken line having an identical number of points. The second evaluation function $F_2$, on the other hand, offers the decimating operation effective when a scale range (maximum magnification ratio) is already determined, enabling removal of finely broken segments of the broken line. These evaluation functions $F_1$ and $F_2$ may be selectively employed depending on the situations or may also be combined as necessary.

Figure 21:
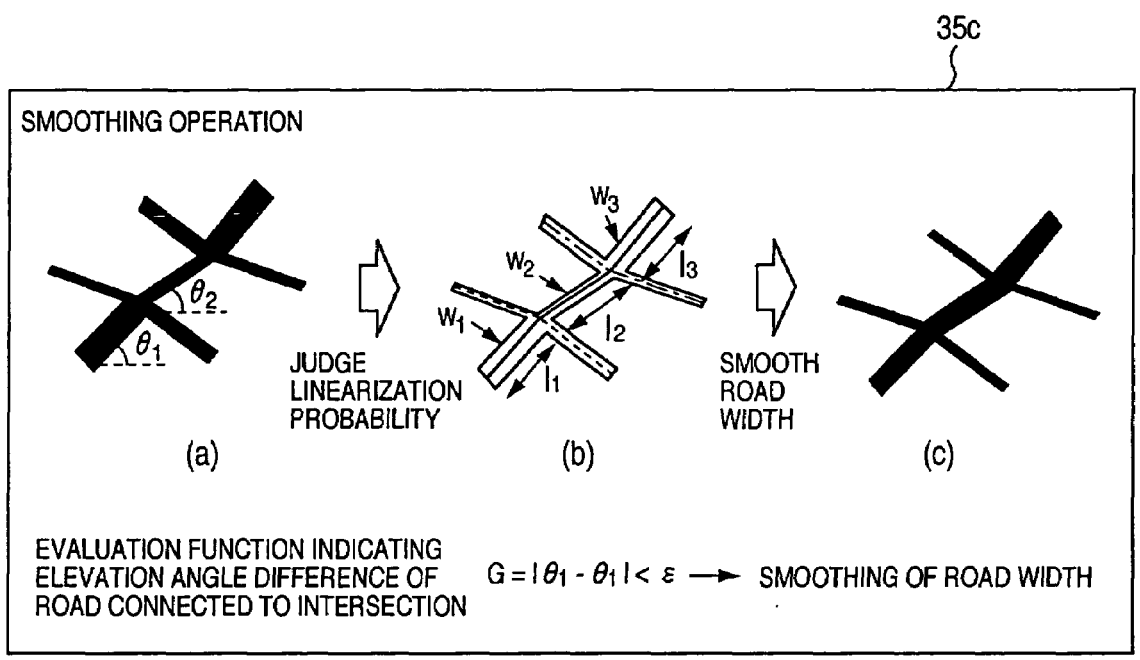
FIG. 21 shows a specific example of smoothing operation in FIG. 18.

FIG. 21 shows a specific example of the smoothing operation 35c in FIG. 18.

A road map is expressed by broken lines indicating road shapes and by the widths of the roads as its attribute. The smoothing operation 35c is applied to each of pairs of roads connected to an intersection. It is assumed in this case that an intersection is expressed as a point at which two or more broken lines meet and includes division points of the point when one road is registered as two divided broken lines.

In FIG. 21, (a) shows an input road map 36. The smoothing operation 35c first judges the linearization probability on the basis of an evaluation function G indicative of an elevation angle difference of a road connected to an intersection. In the judgment of the linearization probability, when the value of the evaluation function G as the absolute value of the elevation angle difference is not larger than a threshold value, the linearization probability is judged as high. In FIG. 21, (b) shows roads which are shown by solid, dotted and chain-dotted lines and which are judged as having high linearization probabilities, that is, along which the vehicle proceeds with high probabilities. Each of the road judged as having high linearization probabilities is smoothed with respect to the road width to obtain such a road map as shown by (c) in FIG. 21. In the illustrated example, the road width is smoothed, by weighting the road widths with their road lengths or the like and then averaging the weighted road widths as an example.

FIG. 22 shows a specific example of the horizontalizing/verticalizing operation 35b in FIGS. 17 to 19.

Figure 22A:
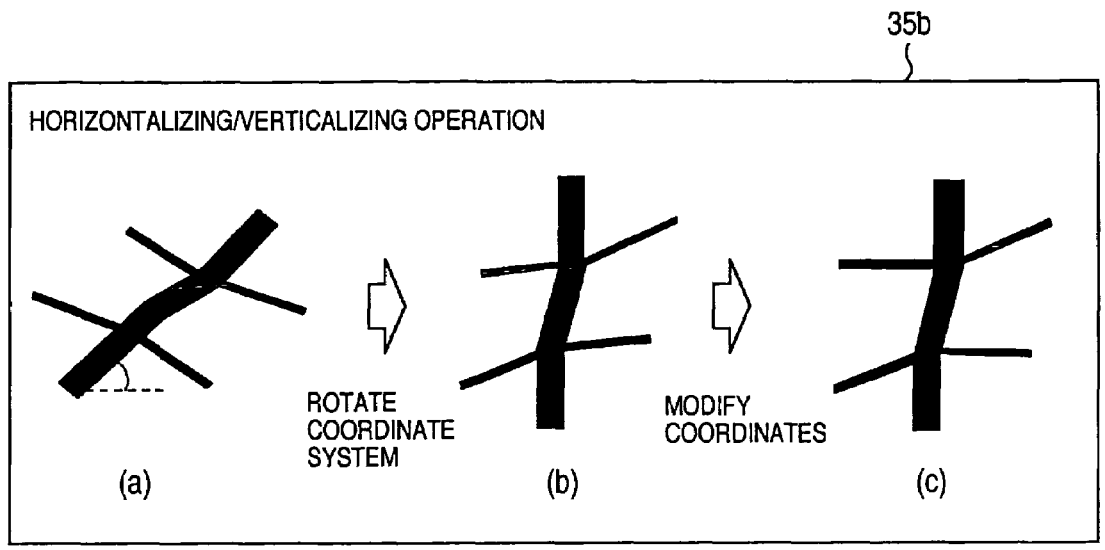
FIGS. 22A and 22B show a specific example of horizontalizing/verticalizing operation in FIGS. 17 to 19.

In FIG. 22A, (a) shows an input road map 36. In the horizontalizing/verticalizing operation 35b, coordinate system rotation is first carried out in such a manner that roads are located as horizontally or vertically as possible. In the coordinate system rotation, for example, histogram analysis is carried out for road directions weighted considering the road length and road width to find one of the road directions which is most aligned, and the rotational angle is determined so that the found direction becomes horizontally or vertically. In FIG. 22A, (b) shows a result after the coordinate system rotation was carried out, wherein a very small displacement is still left in the roads substantially aligned horizontally or vertically. Such a displacement corresponds to about several dots. When an image resolution is low, however, the user cannot see the image easily. To avoid this, such a fine displacement in the roads substantially aligned horizontally or vertically is corrected to obtained such a road map as shown by (c) in FIG. 22A.

Figure 22B:
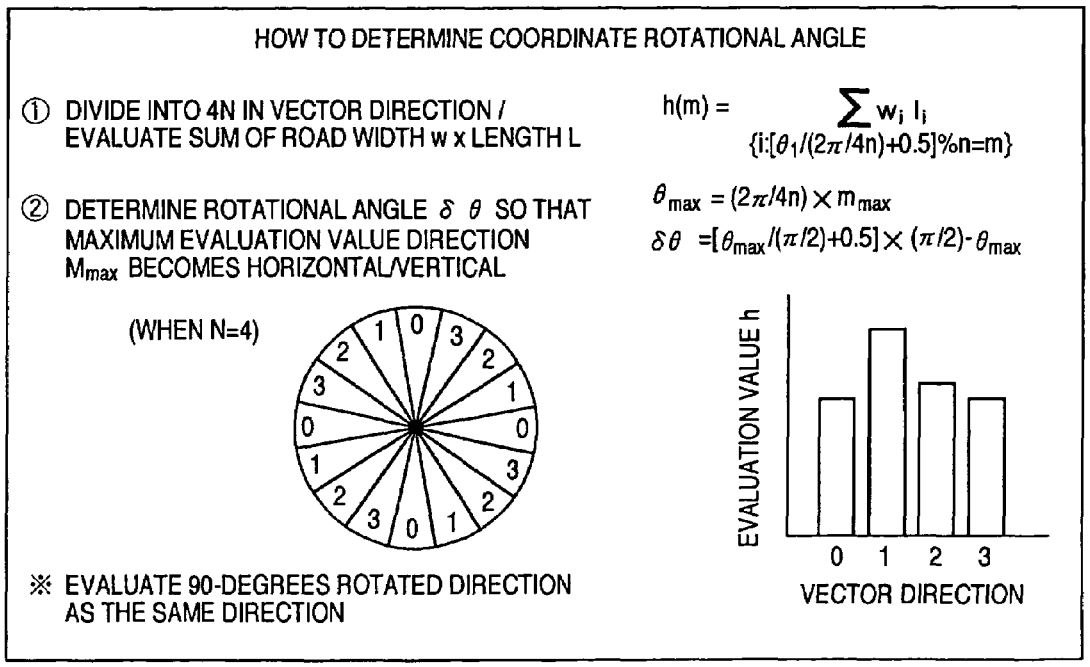

Upon determining the coordinate system rotational angle, as shown FIG. 22B, histogram analysis is carried out for the directions of all constituent vectors of a broken line having a road shape. The vector direction is divided to evaluate (road width $w_i$×length $l_i$), and a rotational angle $\delta\theta$ is determined so that the direction having maximum one of the evaluated values becomes horizontal or vertical. It is assumed in this example that directions rotated by 90 degrees are evaluated as an identical direction, from the fact that, when one of vectors having a right angle is rotated to becomes horizontal, the other vector becomes vertical.

Figure 23:
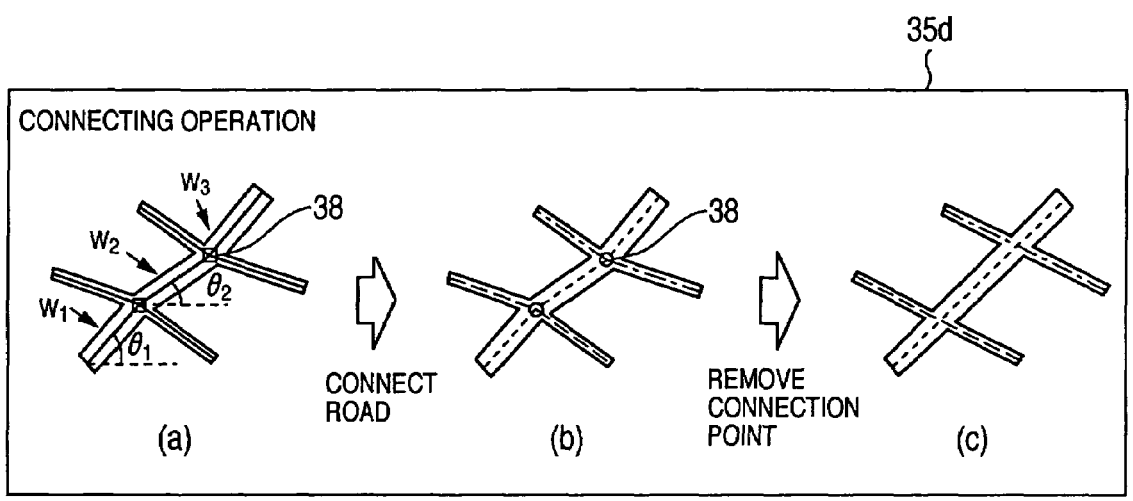
FIG. 23 shows a specific example of connecting operation in FIG. 19.

FIG. 23 shows a specific example of the connecting operation 35d in FIG. 19.

In FIG. 23, (a), an intersection 38 in an input road map to be connected is expressed as a point at which two or more broken lines meet. First, judgment of the linearization probability is carried out by a method similar to the judgment of the linearization probability in the smoothing operation 35c of FIG. 21. In FIG. 23, (b) shows roads judged as having high linearization probabilities by dotted, dashed and chain-dotted lines respectively. By using a method similar to the inflection point decimating method in the linearizing operation 35a of FIG. 20, next, intersection 38 is removed and such a road map as shown in FIG. 23, (c) is obtained as an eventual result.

Explanation will then be made as to the respective operations of the deforming means 32 shown in FIG. 17 using actually processed results.

Figure 25:
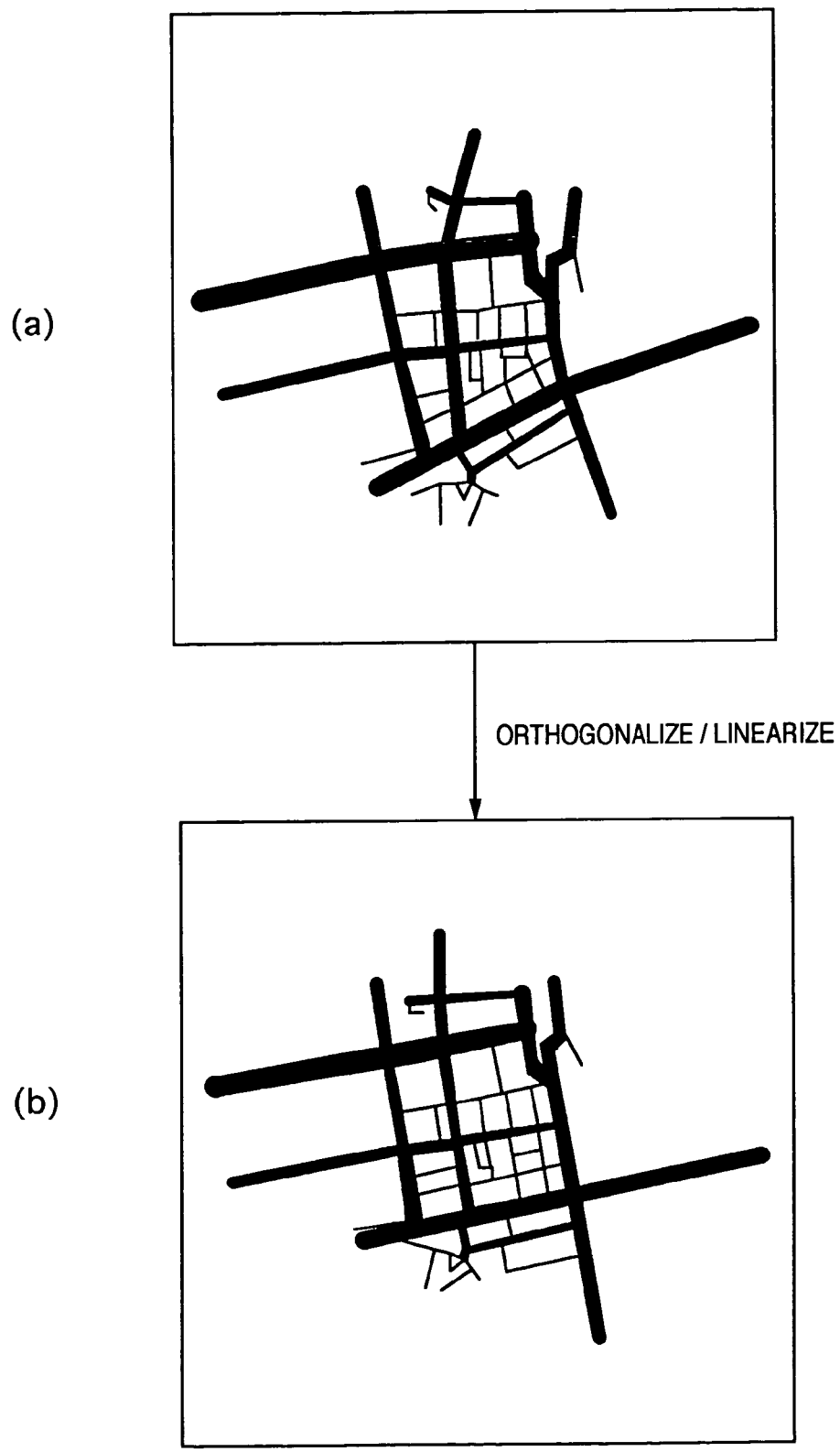
FIG. 25 shows an actually processed result of orthogonalizing/linearizing operation in FIGS. 17 to 19.

FIGS. 24, 25 and 26 show actually processed results of the linearizing operation 35a, orthogonalizing/linearizing operation 34 and horizontalizing/verticalizing operation 35b of FIG. 17, respectively.

As shown in FIG. 24, the linearizing operation 35a performs its inflection point decimating operation while not changing the road shape. In FIG. 23, (a) shows a map before subjected to the linearizing operation and (b) shows a map after subjected to the linearizing operation. As shown in FIG. 25, the orthogonalizing/linearizing operation 34 effectively modifies even a map having a plurality of tangled roads intersected each other. In FIG. 25, (a) and (b) show roads before and after subjected to the orthogonalizing/linearizing operation respectively. As shown in FIG. 26, further, the horizontalizing/verticalizing operation 35b can remarkably reduce jaggy edges appearing in an oblique lines. In FIG. 26, (a) and (b) show roads before and after subjected to the horizontalizing/verticalizing operation respectively. As a result, user's visibility can be enhanced.

Figure 27:
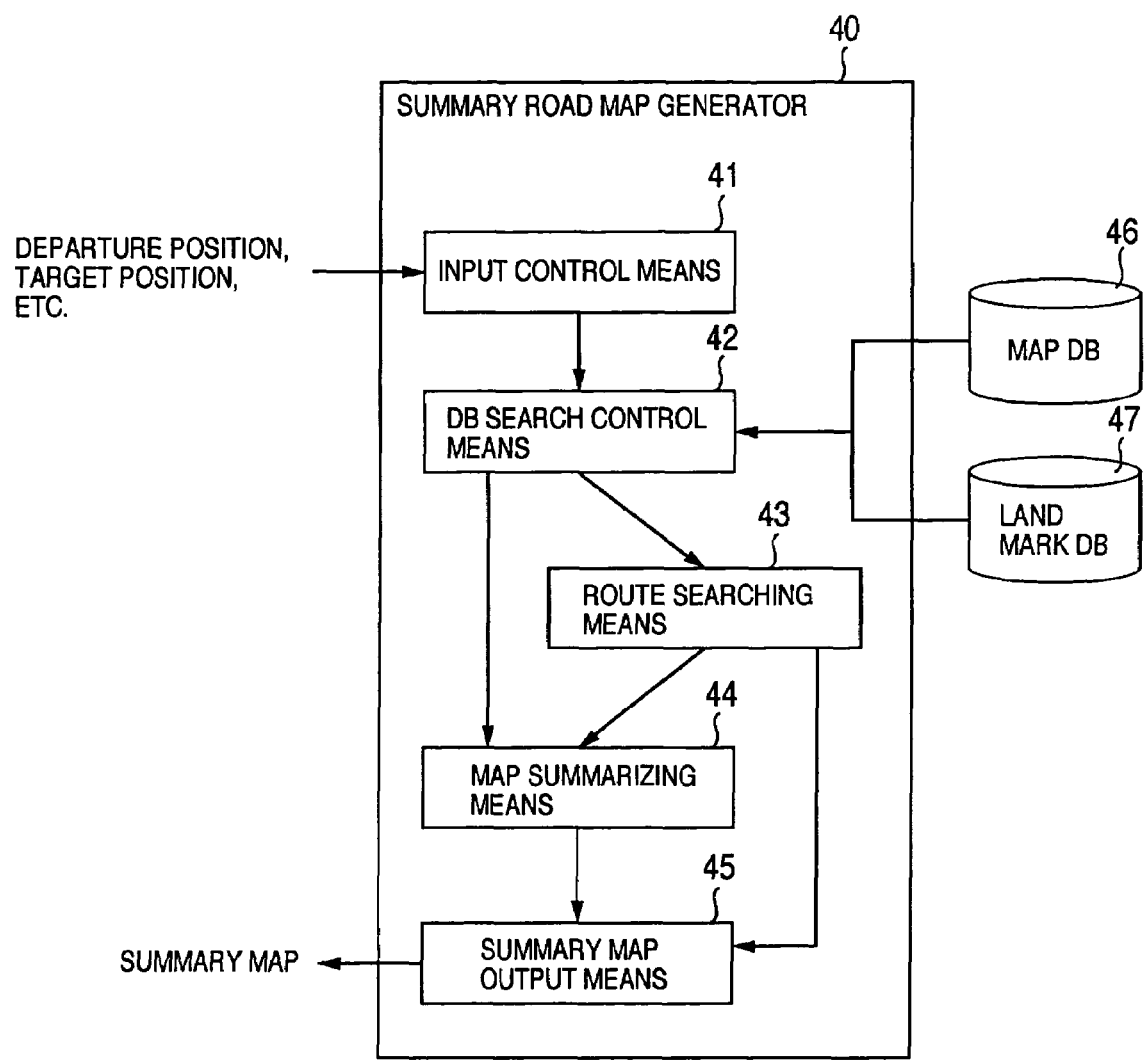
FIG. 27 shows a block diagram of a specific example of a summary road map generator in the present invention.

FIG. 27 shows a specific example of a summary road map generator in the controller 1 (see FIG. 1).

In the drawing, a summary road map generator 40 includes an input control means 41 for accepting user's request of any of at least departure position, current position and target position; a DB search control means 42 for setting search conditions according to the user's request, searching a map database (DB) 46 for a road map and a background map, and searching a land mark DB 47 for a land mark; a route searching means 43 for searching for a route from the departure position to the target position on the basis of the road map when the user wants route guidance; a map summarizing means 44 for applying summarizing operation over the road map, background map and land mark; and a summary map output means 45 for outputting a summary result to an output device.

The map summarizing means 44 inputs the road map, background map, land mark and a searched route result as necessary, and applies the summaring operation over the road map, background map and land mark. The map summarizing means 44 forms the heart of the system in generating a summary road map having a good visibility.

The map DB 46 and the land mark DB 47 form the map database 6 in FIG. 1, but the land mark DB may be provided separately in FIG. 1.

Figure 28:
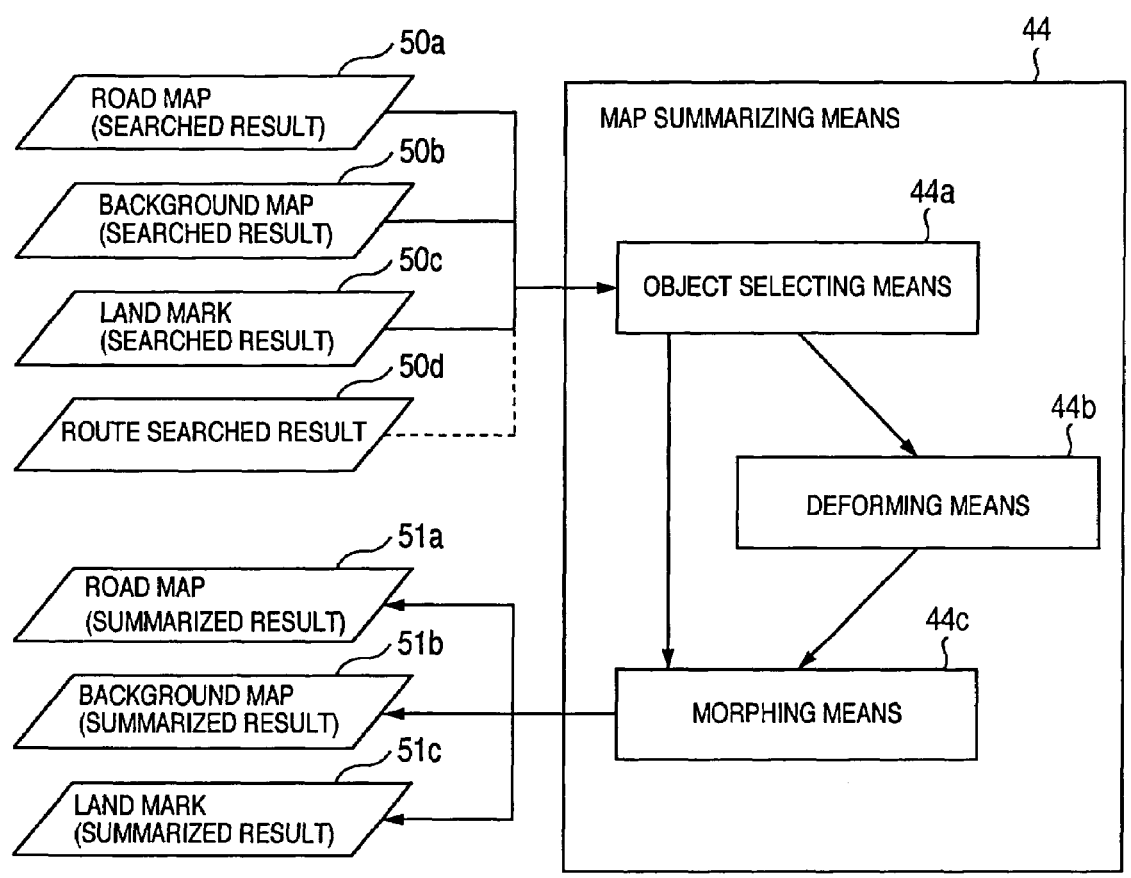
FIG. 28 is a block diagram of a specific example of map summarizing operation sin FIG. 27.

FIG. 28 shows a block diagram of a specific example of the map summarizing means 44 in FIG. 27.

In the drawing, the map summarizing means 44 includes an object selecting means 44a for searching the map DB 46 and the land mark DB 47 for a road map 50a, a background map 50b, and a land mark 50c, inputting these road map, background map and land mark, and as necessary, inputting a searched route result 50d of the route searching means 43 (see FIG. 27), and selecting elements necessary for guidance from the road map 50a, background map 50b and land mark 50c; a deforming means 44b for processing the elements selected from the road map 50a into shapes having a good visibility; and a morphing means 44c for modifying the elements selected from the background map 50b and land mark 50c following the deforming operation of the road map 50a. The map summarizing means 44 outputs a road map 51a, a background map 51b and a land mark 51c as a summary result. The deforming means 44b now performs its deforming operation of FIG. 17, 18 or 19.

In the above case, the summary road map generator 40 is provided in the controller 1 of the in-car navigation system of FIG. 1, the controller 1 creates a summary road map. However, such summary a road map generator 40 may be provided a server and the in-car navigation system may receive summary road map data from the server. Explanation will be made as to a summary road map service system of the latter case.

Figure 29:
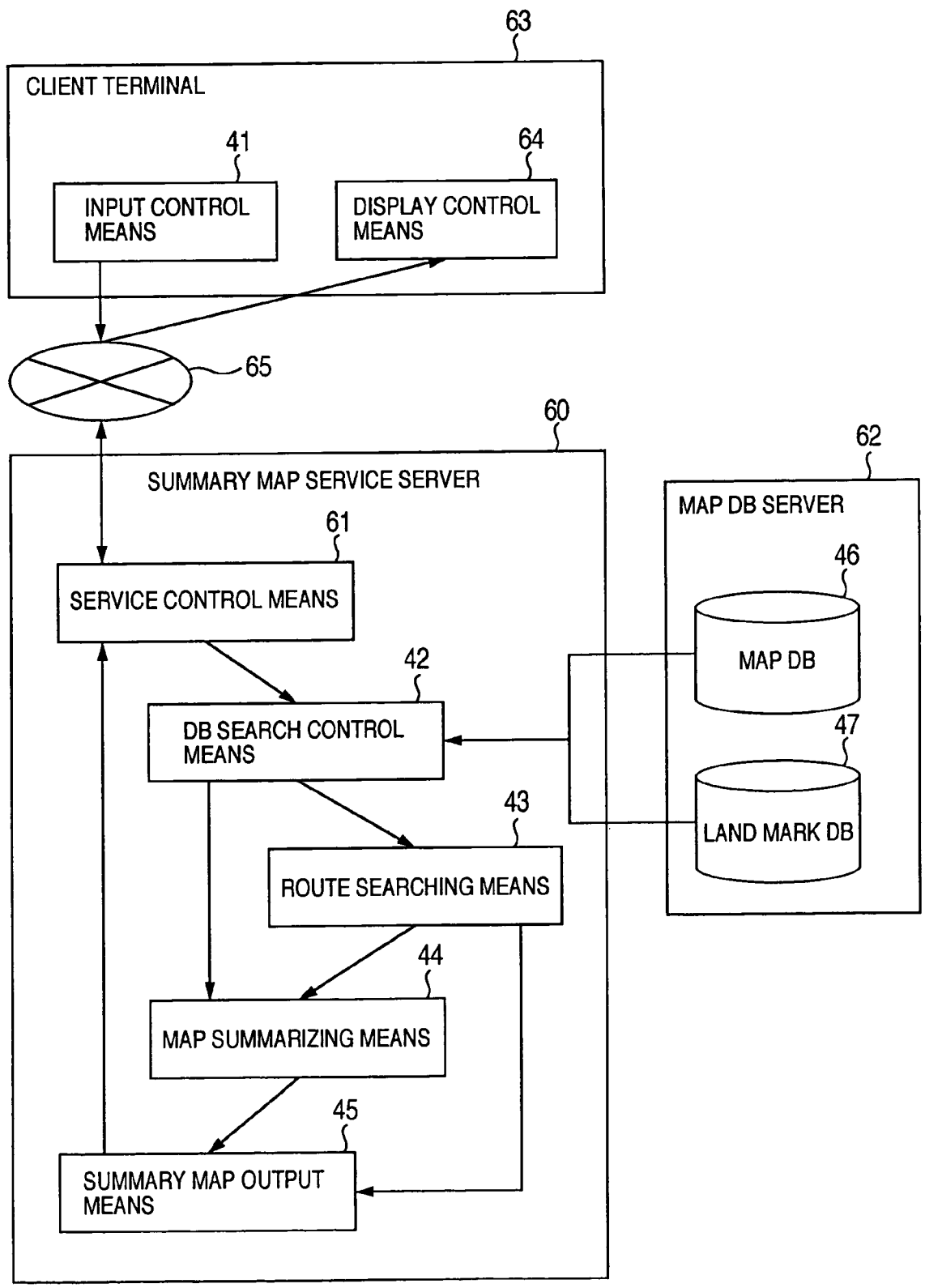
FIG. 29 is an arrangement of a specific example of a summary road map service system in accordance with the present invention.

FIG. 29 shows a configuration of a specific example of a summary road map service system having the summary road map generator 40 provided in a server, wherein reference numeral 60 denotes a summary map service server, numeral 61 denotes a service control means, 62 denotes a map DB server, 63 denotes a car navigation system shown in FIG. 1, 64 denotes a display control means, 65 denotes a network. In FIG. 29, parts corresponding to those in FIG. 27 are denoted by the same reference numerals and explanation thereof is omitted.

In the drawing, the system includes the car navigation system 63 operated by the user, the summary map service server 60 for offering a summary road map service to the user, and the map DB server 62 having the map DB 46 and land mark DB 47 incorporated therein. The car navigation system 63 and the summary map service server 60 are connected to each other via the network 65 including a wireless data communication network.

In the illustrated example, the summary map service server 60 has the service control means 61 for accepting a user's request from the car navigation system 63 and for controlling a service down to the distribution of a summary road map; the DB search control means 42 for searching the map DB 46 of the map DB server 62 for a road map or a background map or a map associated with a route (searched in the latter) and also for searching the land mark DB 47 for a land mark respectively; the route searching means 43, when the user wants a route guidance, for searching for a route from a departure position to a target position on the basis of the road map; the map summarizing means 44 for applying summarizing operation over the road map, background map and land mark; and the summary map output means 45 for converting a summary result into an image or vector map.

The car navigation system 63 has the input control means 41 for accepting user's request about any of at least the departure position, the current position and the target position, and the display control means 64 for displaying a summary result on the output device. Accordingly, in the car navigation system 63, these input control means 41 and display control means 64 are included in the controller 1 in FIG. 1.

In other words, in the specific example, the input control means 41 of the summary road map generator 40 shown in FIG. 27 is provided in the car navigation system 63, the other arrangement corresponds to the arrangement of the summary map service server 60. Since all processing operations are executed on the side of the server 60, the load of the car navigation system 63 can be lightened and management of the latest map can be facilitated.

Figure 30:
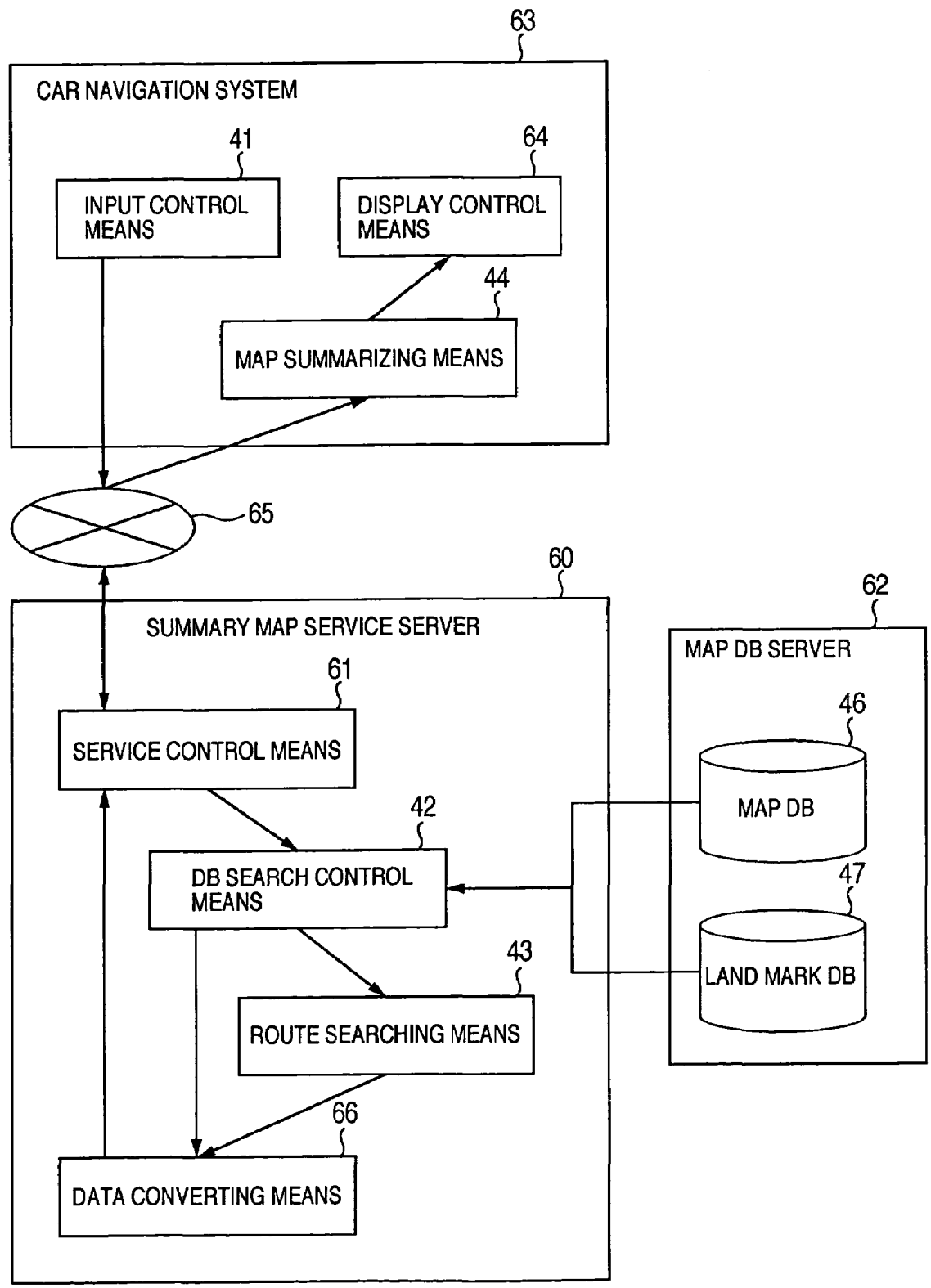
FIG. 30 is an arrangement of another specific example of the summary road map service system in accordance with the present invention.

FIG. 30 shows a block diagram of another specific example of the summary road map service system, wherein reference numeral 66 denotes a data converting means and parts corresponding to those in FIG. 29 are denoted by the same reference numerals.

In the drawing, the summary map service server 60 includes a service control means 61 for accepting a user's request from the car navigation system 63 and controlling a service down to distribution of map data; a DB search control means 42 for searching a map DB 46 for a road map and a background map and searching a land mark DB 47 for a land mark; a route searching means 43, when the user wants a route guidance, for searching a route from a departure position to a target position on the basis of the road map; and a data converting means 66 for extracting data necessary for generating a summary road map from the road map, the background map, the land mark and the searched route result of the route searching means 43 as necessary and for converting the extracted data into data having a format suitable for the distribution.

The car navigation system 63 has an input control means 41 for accepting the user's request about any of at least the departure position, current position and target position, a map summarizing means 44 for subjecting the road map, background map and land mark to the summarizing operation, and a display control means 64 for displaying the summary result on an output device. That is, part of the functions of the summary map service server 60 shown in FIG. 29 is moved to the car navigation system 63. In this specific example, more specifically, the input control means 41 and the map summarizing means 44 in the summary road map generator 40 of FIG. 27 are provided in the car navigation system 63, and other constituent parts or elements are provided in the summary map service server 60. In the car navigation system 63, the input control means 41, the map summarizing means 44 and the display control means 64 are included in the controller 1 in FIG. 1. In this case, the summarizing operation can be realized while eliminating the need for establishing a communication line according to every user's request.

Figure 31:
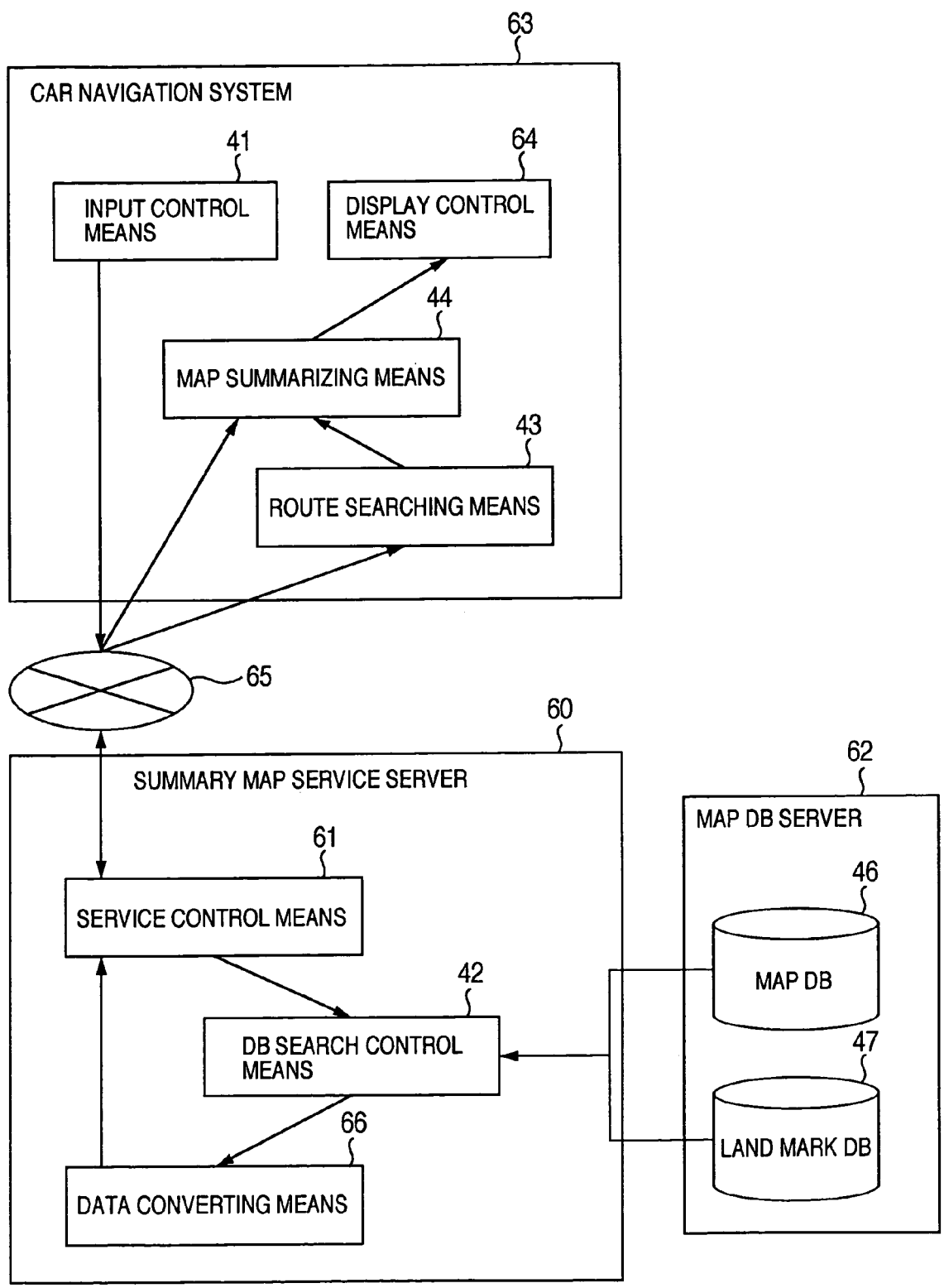
FIG. 31 is an arrangement of a further specific example of the summary road map service system in accordance with the present invention.

FIG. 31 shows a further specific example of the summary road map service system, wherein parts corresponding to those in FIG. 30 are denoted by the same reference numerals.

In this specific example, part of the functions of the summary map service server 60 in FIG. 29 is shifted to the car navigation system 63.

In FIG. 31, the summary map service server 60 has a service control means 61 for accepting a user's request from the car navigation system 63 and controlling a service down to distribution of map data, a DB search control means 42 for setting search conditions according to the user's request and for searching a map DB 46 for a road map and a background map and searching a land mark DB 47 for a land mark respectively, and a data converting means 66 for extracting data necessary for generating a summary road map from the road map, background map and land mark and converting the extracted data into data having a format suitable for the distribution.

The car navigation system 63 has an input control means 41 for accepting the user's request about any of at least a departure position, current position and a target position, a route searching means 43, when the user wants a route guidance, for searching for a route from the departure position to the target position on the basis of the road map, a map summarizing means 44 for subjecting the road map, background map and land mark to the summarizing operation, and a display control means 64 for displaying the summary result on an output device. In the car navigation system 63, the input control means 41, route searching means 43, map summarizing means 44, and display control means 64 are provided in the controller 1 in FIG. 1.

In the specific example, more specifically, the input control means 41, route searching means 43, and map summarizing means 44 in the summary road map generator 40 are provided in the car navigation system 63, and the other constituent elements are provided in the summary map service server 60. With such an arrangement, a new route can be searched for without intervention of a server.

Explanation will now be made as to another specific example of the road map transformer.

Figure 32:
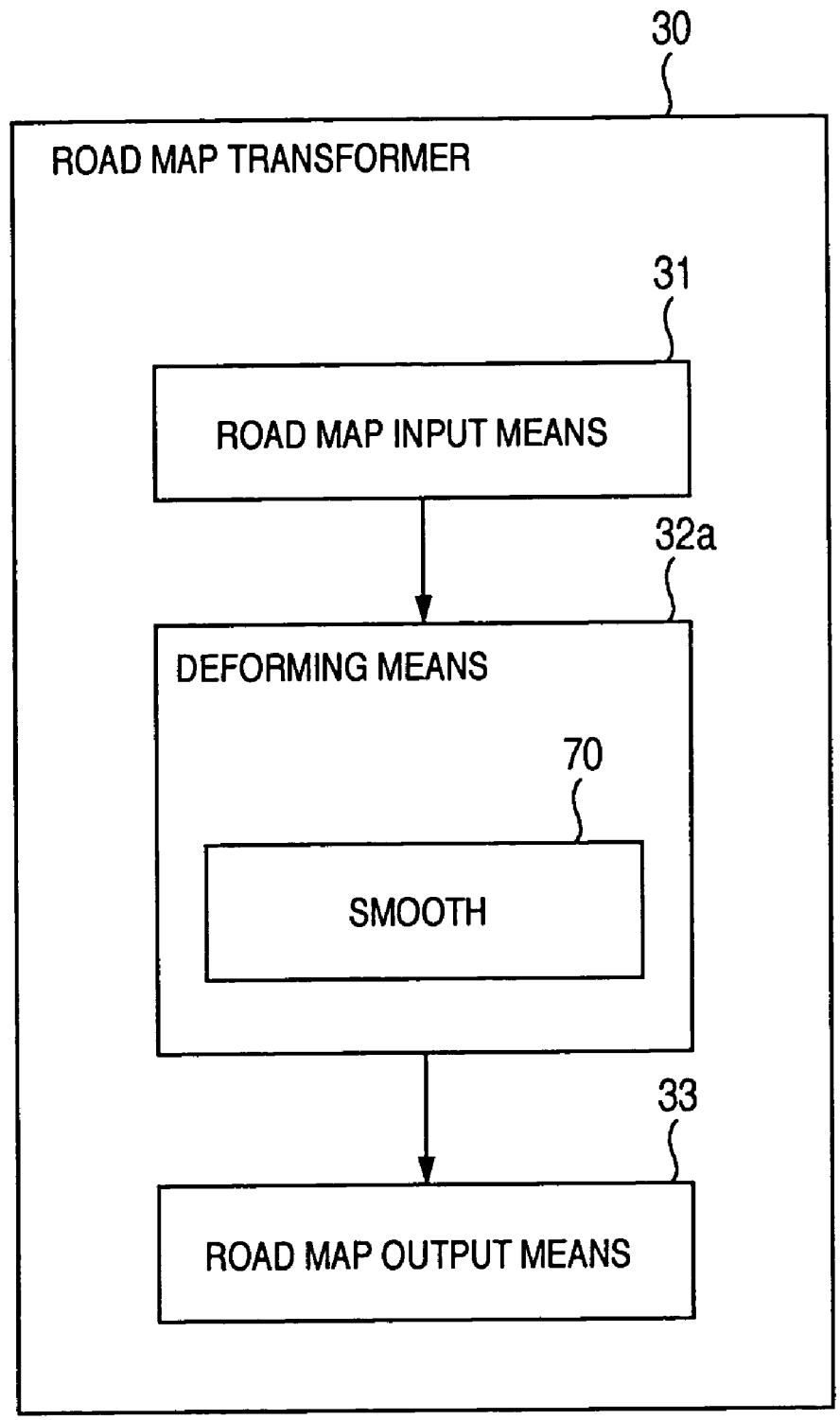
FIG. 32 is a functional block diagram of another specific example of a road map transformer in the present invention.

FIG. 32 shows a functional block diagram of another specific example of the road map transformer, wherein a deforming means 32a performs smoothing operation 70.

Figure 33:
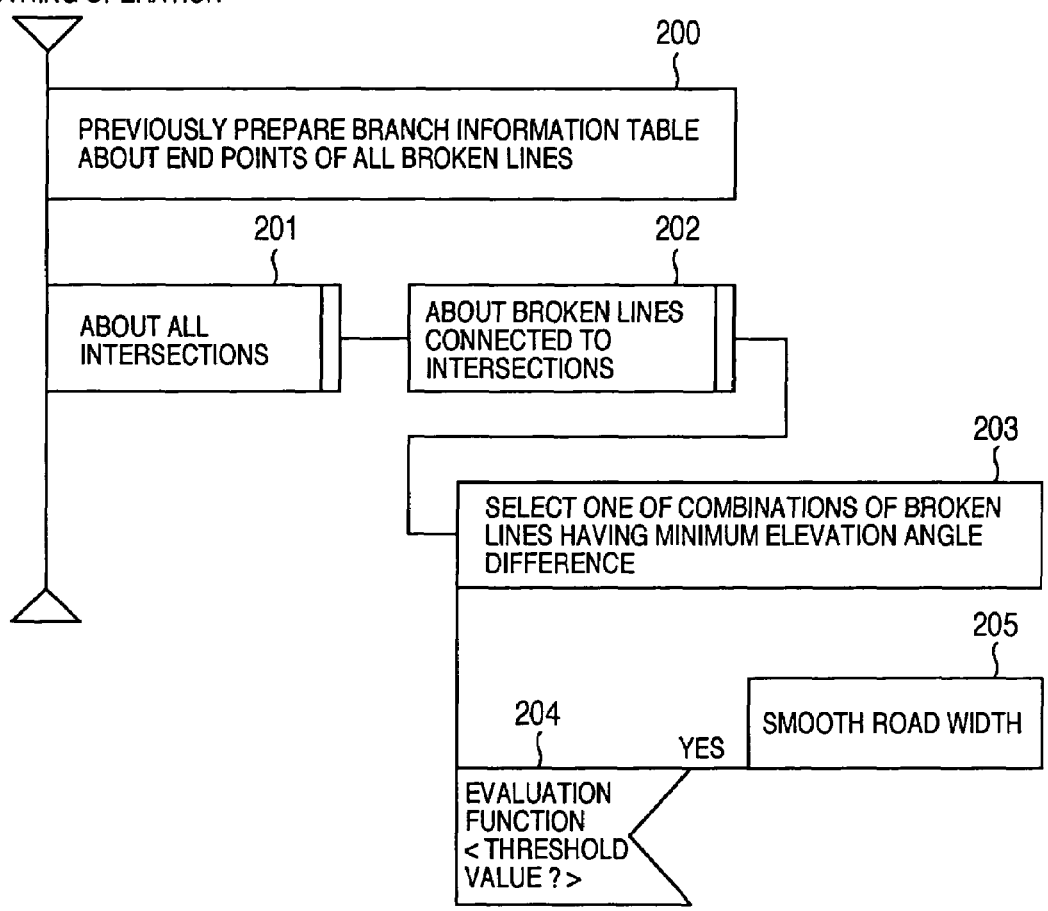
FIG. 33 is a flow chart of a flow of smoothing operation in FIG. 32.

In the smoothing operation 70, as shown in FIG. 33, a branch information table is previously created for end points of all broken lines (step 200) and control proceeds to a repetition loop (step 201) for all intersections. In the loop, control goes to a loop for broken lines connected to the intersection (step 202), where a step 203 of selecting one of combinations of the broken lines having a minimum elevation angle difference and a step 204 of judging whether or not an evaluation function is smaller than a threshold value are repeated. When the judging conditions are satisfied, a road width is smoothed (step 205).

Figure 34:
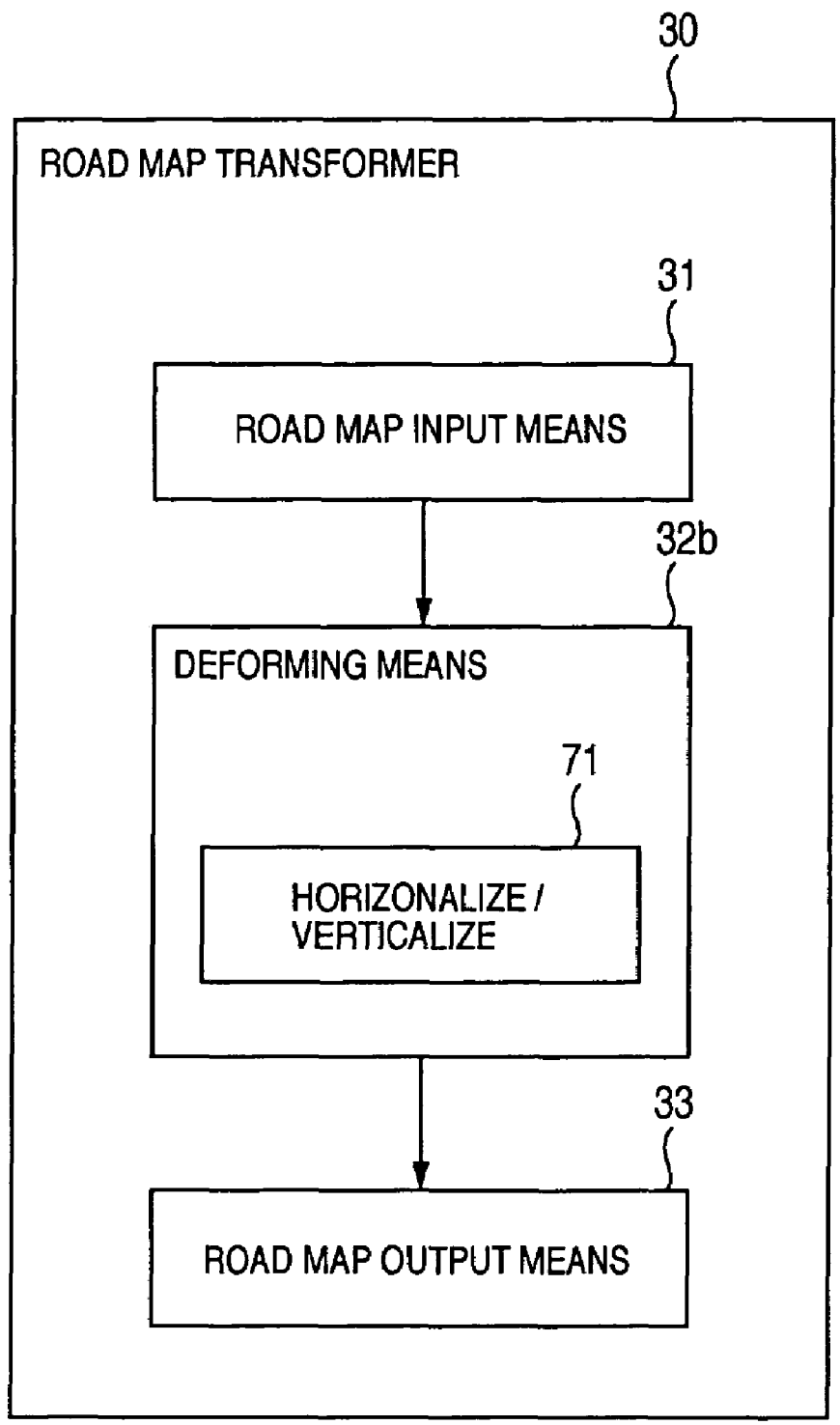
FIG. 34 is a functional block diagram of a further specific example of the road map transformer in the present invention.

FIG. 34 is a functional block diagram of a further specific example of the road map transformer, wherein a deforming means 32b performs horizontalizing/verticalizing operation 71.

Figure 35:
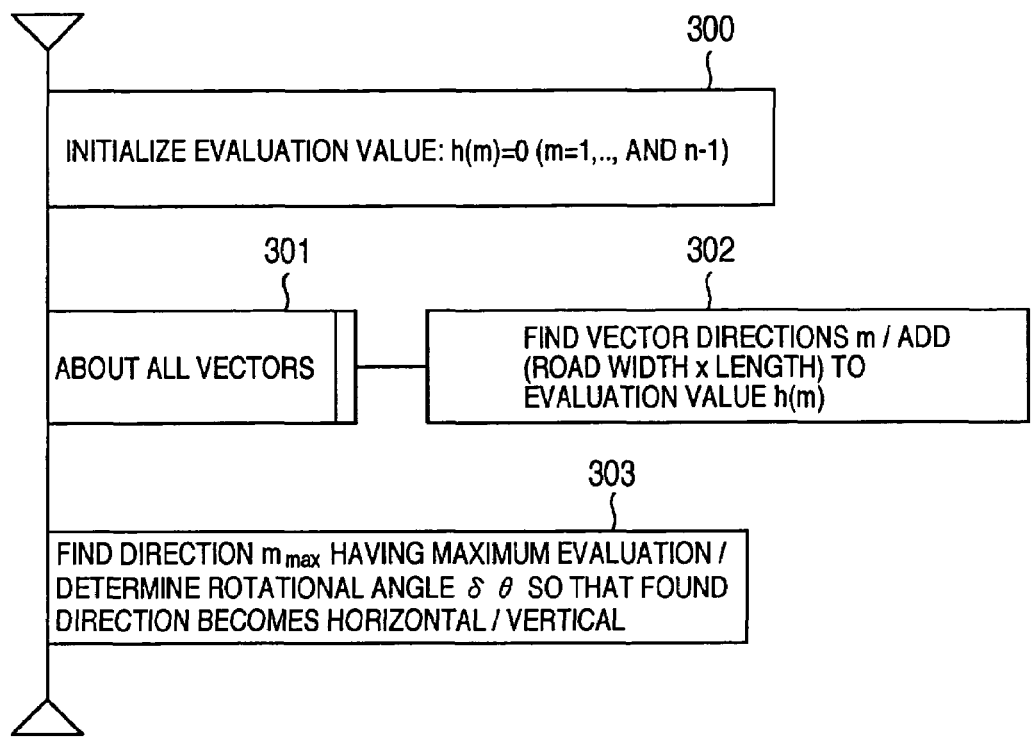
FIG. 35 is a flowchart showing a flow of the smoothing operation in FIG. 34.

In the deforming means 32b, for example, as shown in FIG. 35, evaluation value is first initialized (step 300), control proceeds to a next step 301, vector directions for all vectors are found, (road width×length) is added to the evaluation value (step 302). And maximum one of the directions having a maximum evaluation value is found, and an rotational angle is determined so that the found direction becomes horizontal or vertical (step 303).

As has been explained above, in accordance with the present invention, since a summary road map simplified from a two-dimensional road map and showing a vehicle traveling route can be expressed, the user can intuitively grasp a vehicle positional relation. Further, since a place at which the user wants to drop in is expressed by a land mark, the user can know its location generally, thus avoiding such a situation that the driver must run the vehicle while searching for the place.

Since a route from the departure position to the target position can be briefly expressed on the summary road map, the user can easily confirm the full route. In addition, when the system receives traffic information on a traffic jam or the like during traveling along the route, the traffic information is expressed on the route, whereby the user can easily the then state of the running route. Simultaneously with it, since a passable detour is shown on the map, the driver can immediately cope with such traffic situation.

Additionally, as the vehicle approaches a main intersection, an area including the intersection is expressed as enlarged on the summary road map. Thus the driver can easily know the state of the running route up to the intersection and, even when the vehicle turns right or left at the intersection, the driver can easily direct the vehicle to the desired direction.

The above explanation has been made as to how to process the roads. In addition to it, however, a place tile or building as its background can be removed or selected, a land mark can be combined with the roads processed above, and be expressed as in FIG. 3, 9 or 11, as a matter of course.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A car navigation system comprising:
   a map generator configured to display at least one of two-dimensional maps, three-dimensional maps and bird's-eye-view maps, from mapping information provided from a database;
   a position detector adapted to detect a position of a vehicle;
   a search unit adapted to search for a route between the detected vehicle position and a specified target position, or a specified departure position and the specified target position, under set conditions;
   a map summarizing unit adapted to generate a summary road map having a reduced amount of information and having deformed roads more orthogonalized and/or linearized than the at least one of two-dimensional maps, three-dimensional maps and bird's-eye-view maps, and including a simplified route between the detected vehicle position and the specified target position, or the specified departure position and the specified target position, with highlighted lines, by applying a summarizing operation including at least one of an orthogonalizing and linearizing operation over a main road including a running route;
   a display unit adapted to display the summary road map of the simplified route; and
   a communication unit for receiving traffic information, and wherein the display unit displays the traffic information received by the communication unit on the summary road map with respect to a corresponding route displayed thereon.

2. The car navigation system according to claim 1, wherein the search unit also searches for another route between the detected vehicle position and the specified target position, or the specified departure position and said the specified target position, when an impediment is detected with respect to the simplified route, and the display unit displays the summary road map of at least one other route between the detected vehicle position and the specified target position, or the specified departure position and the specified target position, searched by the search unit, by simplified highlighted lines.

3. The car navigation system according to claim 1, wherein the display unit displays a detour responsive to the traffic information indicating an impediment of passage of the vehicle on the summary road map.

4. The car navigation system according to claim 3, wherein, when traffic information which impedes the passage of the vehicle is received by the communication unit, the display unit displays two windows including the summary road map and at least one of the two-dimensional maps, three-dimensional maps or bird's-eye-view maps.

5. The car navigation system according to claim 1, wherein the vehicle position is displayed by a mark in the summary road map.

6. The car navigation system according to claim 1, wherein roads displayed in the summary road map are displayed as made linear, and roads which meet at an intersection are displayed as made orthogonal to each other.

7. The car navigation system according to claim 1, wherein the display unit displays the simplified route without a map.

8. The car navigation system according to claim 4, wherein the display unit switches to the at least one of two-dimensional maps, three-dimensional maps or bird's-eye-view maps, when the vehicle position shifts to the detour.

9. The car navigation system according to claim 1, wherein the display unit displays a road map, and the road map is at least one of the two-dimensional maps, three-dimensional maps or bird's-eye-view maps.

10. The car navigation system according to claim 1, wherein the display unit is configured to display the summary road map automatically responsive to a predetermined change in positioning of the vehicle on the at least one of two-dimensional maps, three-dimensional maps and bird's-eye-view maps.

11. The car navigation system according to claim 1, comprising a deforming means for performing the at least one of the orthogonalizing and linearizing operation.

12. A car navigation system comprising:
   a map generator configured to display at least one of two-dimensional maps, three-dimensional maps and bird's-eye-view maps, from mapping information provided from a database;
   a position detector adapted to detect a current position of a vehicle;
   an input unit adapted to input a target position;
   a search unit adapted to search for a running route on the basis of the detected current position and the inputted target position;
   a map summarizing unit adapted to generate a summary road map having a reduced amount of information and having deformed roads more orthogonalized and/or linearized than the at least one of two-dimensional maps, three-dimensional maps and bird's-eye-view maps, by applying a summarizing operation including at least one of an orthogonalizing and linearizing operation over a main road including a running route, where the summary road map shows a path from the current vehicle position to a next turning corner on the searched running route; and
   a display unit adapted to display the summary road map,
   wherein, when the current vehicle position arrives at a position within a predetermined range from the next turning corner, the display unit automatically displays the summary road map from the current vehicle position to the next turning corner with a mark of the current vehicle position, and
   wherein the predetermined range is broader than a display range of a magnified road map displayed for the next turning corner.

13. The car navigation system according to claim 12, wherein the display unit displays a window of the summary road map with a window of a road map including the searched running route.

14. The car navigation system according to claim 12, wherein the display unit displays a road map, and the road map is at least one of the two-dimensional maps, three-dimensional maps or bird's-eye-view maps.

15. The car navigation system according to claim 12, comprising a deforming means for performing the at least one of the orthogonalizing and linearizing operation.

* * * * *